US009025295B2

(12) United States Patent
Wang et al.

(10) Patent No.: US 9,025,295 B2
(45) Date of Patent: *May 5, 2015

(54) PROTECTIVE DEVICE AND PROTECTIVE MODULE

(71) Applicant: Cyntec Co., Ltd., Hsinchu (TW)

(72) Inventors: Chung-Hsiung Wang, Hsinchu (TW); Hung-Ming Lin, Hsinchu County (TW); Lang-Yi Chiang, Hsinchu County (TW); Wen-Shiang Luo, Taipei (TW); Kuo-Shu Chen, Hsinchu County (TW); Han-Yang Chung, Taoyuan County (TW); Hui-Wen Hsu, Yunlin County (TW); Po-Wei Su, Taichung (TW); Hong-Ming Chen, Hsinchu County (TW)

(73) Assignee: Cyntec Co., Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/162,185

(22) Filed: Jan. 23, 2014

(65) Prior Publication Data

US 2014/0133059 A1 May 15, 2014

Related U.S. Application Data

(60) Continuation-in-part of application No. 13/894,160, filed on May 14, 2013, now Pat. No. 8,675,333, which is a division of application No. 12/875,752, filed on Sep. 3, 2010, now Pat. No. 8,472,158.

(30) Foreign Application Priority Data

| | | |
|---|---|---|
| Sep. 4, 2009 | (TW) | 98129872 A |
| Sep. 4, 2009 | (TW) | 98129874 A |
| May 14, 2010 | (TW) | 99115506 A |
| Jul. 17, 2013 | (TW) | 102125568 A |

(51) Int. Cl.

*H02H 5/00* (2006.01)
*H01H 85/041* (2006.01)

(Continued)

(52) U.S. Cl.

CPC ......... *H01H 85/0411* (2013.01); *H01H 69/022* (2013.01); *H01H 85/0065* (2013.01); *H01H 85/046* (2013.01)

(58) Field of Classification Search

CPC ................................................. H01H 85/0411
USPC ......................................................... 361/103
See application file for complete search history.

(56) References Cited

U.S. PATENT DOCUMENTS 4,973,932 A 11/1990 Krueger et al.
5,712,610 A 1/1998 Takeichi et al.

(Continued)

FOREIGN PATENT DOCUMENTS

CN 1795280 6/2006
CN 1848351 A 10/2006

(Continued)

OTHER PUBLICATIONS

"First Office Action of China Counterpart Application", issued on Oct. 12, 2012, p. 1-p. 5.

(Continued)

*Primary Examiner* — Stephen W Jackson

(74) *Attorney, Agent, or Firm* — Birch, Stewart, Kolasch & Birch, LLP

(57) ABSTRACT

A protective device includes a substrate, an electrode layer, a metal structure, an outer cover and an arc extinguishing structure. The electrode layer is disposed on the substrate. The electrode layer includes at least one gap. The metal structure is disposed on the electrode layer and located above the gap, and the metal structure has a melting temperature lower than a melting temperature of the electrode layer. The outer cover is disposed on the substrate and covers the metal structure and a portion of the electrode layer. The arc extinguishing structure is disposed between the outer cover and the substrate. A protective module is further provided.

22 Claims, 28 Drawing Sheets

(51) Int. Cl.
*H01H 85/00* (2006.01)
*H01H 69/02* (2006.01)
*H01H 85/046* (2006.01)

(56) References Cited

U.S. PATENT DOCUMENTS

| | | | | |
|---|---|---|---|---|
| 5,939,969 | A | 8/1999 | Doerrwaechter et al. | |
| 6,344,633 | B1 | 2/2002 | Furuuchi | |
| 6,452,475 | B1 | 9/2002 | Kawazu et al. | |
| 6,566,995 | B2 | 5/2003 | Furuuchi et al. | |
| 6,645,637 | B2 | 11/2003 | Kaltenborn et al. | |
| 7,148,443 | B2 * | 12/2006 | Bong | 219/73.1 |
| 7,286,037 | B2 | 10/2007 | Furuuchi | |
| 7,382,088 | B2 | 6/2008 | Azuma et al. | |
| 7,557,434 | B2 | 7/2009 | Malhan et al. | |
| 7,679,330 | B2 | 3/2010 | Furuuchi et al. | |
| 7,951,699 | B2 | 5/2011 | Iwasaki et al. | |
| 8,472,158 | B2 * | 6/2013 | Wang et al. | 361/104 |
| 8,547,195 | B2 | 10/2013 | Kimura et al. | |
| 8,675,333 | B2 * | 3/2014 | Wang et al. | 361/103 |
| 2001/0044168 | A1 | 11/2001 | Furuuchi et al. | |
| 2002/0014945 | A1 | 2/2002 | Furuuchi et al. | |
| 2002/0041944 | A1 | 4/2002 | Stavnes et al. | |
| 2005/0140491 | A1 | 6/2005 | Uehara et al. | |
| 2005/0141164 | A1 | 6/2005 | Bender et al. | |
| 2006/0028314 | A1 | 2/2006 | Furuuchi | |
| 2010/0194519 | A1 | 8/2010 | Harris et al. | |
| 2012/0068809 | A1 | 3/2012 | Spalding | |

FOREIGN PATENT DOCUMENTS

| | | | |
|---|---|---|---|
| CN | 1897203 | A | 1/2007 |
| CN | 101373680 | A | 2/2009 |
| CN | 101399100 | | 4/2009 |
| JP | 62-136231 | | 3/1987 |
| JP | 62107341 | | 7/1987 |
| JP | 05-174678 | | 7/1993 |
| JP | 07-153367 | | 6/1995 |
| JP | 09213184 | | 8/1997 |
| JP | 2000-011831 | | 1/2000 |
| JP | 2001-57139 | A | 2/2001 |
| JP | 2001-118481 | | 4/2001 |
| JP | 2001509945 | | 7/2001 |
| JP | 2001-222938 | | 8/2001 |
| JP | 2001-325868 | A | 11/2001 |
| JP | 2004179309 | | 6/2004 |
| JP | 2004-185960 | | 7/2004 |
| JP | 2004-265617 | | 9/2004 |
| JP | 2005-129352 | | 5/2005 |
| JP | 2005-150075 | | 6/2005 |
| JP | 2009-259724 | | 11/2009 |
| TW | 486707 | B | 5/2002 |
| TW | 503421 | B | 9/2002 |
| TW | I296122 | B | 4/2008 |
| TW | 200926239 | A | 6/2009 |
| TW | M363673 | | 8/2009 |
| TW | M363674 | | 8/2009 |
| TW | 200949887 | A1 | 12/2009 |

OTHER PUBLICATIONS

"Office Action of Japan Counterpart Application", issued on Aug. 7, 2012, p. 1-p. 3.

"Office Action of Japan Counterpart Application", issued on Aug. 28, 2012, p. 1-p. 3.

"Office Action of U.S. Counterpart Application", issued on Aug. 2, 2012, p. 1-p. 12.

* cited by examiner

PROTECTIVE DEVICE AND PROTECTIVE MODULE

CROSS-REFERENCE TO RELATED APPLICATIONS

The present application is a continuation-in-part application claiming benefit of U.S. patent application bearing a Ser. No. 13/894,160 filed May 14, 2013, which is a divisional application claiming benefit of U.S. patent application Ser. No. 12/875,752 filed Sep. 3, 2010, now U.S. Pat. No. 8,472, 158 issued Jun. 25, 2013, claiming benefit of Taiwanese Patent Application No. 98129872 filed Sep. 4, 2009, 98129874 filed Sep. 4, 2009, and 99115506 filed May 14, 2010, respectively. The entirety of each of the above-mentioned patent application is hereby incorporated by reference herein and made a part of this specification. The present application is also based upon and claims the benefit of priority from the prior Taiwanese Patent Application No. 102125568, filed Jul. 17, 2013, the entire contents of which are incorporated herein by reference.

FIELD OF THE INVENTION

The present invention relates to a protective device, and more particularly to a protective device having an arc extinguishing structure, and a protective module having an overcurrent and overvoltage protective device.

BACKGROUND OF THE INVENTION

In recent years, the electronic product is widely used in society, and most people use the electronic product in daily life. The electronic product has a circuit therein. Whether the circuit is simple or complicated, the circuit usually includes a passive device such as a resistance device, a capacitance device, an inductance device or an overcurrent and overvoltage protective device, etc.

In regard to the overcurrent and overvoltage protective device, it is used to prevent the sophisticated electronic product from being damaged and protect the circuit and elements in the circuit when a transient overcurrent or overvoltage is occurred. The overcurrent and overvoltage protective device includes a safety fuse made of alloy material. When a transient current exceeds a predetermined value, the heat energy caused by the transient overcurrent will melt the safety fuse, and thus the circuit is broken. Such that, the overcurrent can't flow into the circuit, thereby preventing the electronic product from being damaged.

In general, a breaking capacity test is performed for the manufactured overcurrent and overvoltage protective device to determine whether the insulation impedance of the overcurrent and overvoltage protective device is qualified or not. The breaking capacity test is varied according to the type or the demand of the electronic product. In the breaking capacity test, a high power is applied, and the safety fuse of the overcurrent and overvoltage protective device will be transitorily melted, thereby resulting in an arcing effect. The arcing effect will generate very high temperature, thereby melting alloy, flux and so on in fuse, and then inducing more conductive material, increasing conductive path between electrodes, decreasing the insulation between the electrodes, and even generating the short circuit between the electrodes when the cross-electrode in fuse is melted. If the fuse is not completely disconnected by the arcing effect (i.e. impedance between the electrodes is less than 1 MΩ), the fuse can't provide protect function, and the electronic elements of the electronic product may be damaged since the electronic elements may continuously and dangerously work. Therefore, it is an important topic to resolve the problem.

SUMMARY OF THE INVENTION

The present invention provides a protective device to resolve problems caused by an arcing effect.

The present invention further provides a protective module to resolve problems caused by an arcing effect.

To achieve at least one of the above-mentioned advantages, an embodiment of the present invention provides a protective device which includes a substrate, an electrode layer, a metal structure, an outer cover and an arc extinguishing structure. The electrode layer is disposed on the substrate. The electrode layer includes at least one gap. The metal structure is disposed on the electrode layer and located above the gap, and has a melting temperature lower than a melting temperature of the electrode layer. The outer cover is disposed on the substrate and covers the metal structure and a portion of the electrode layer. The arc extinguishing structure is disposed between the outer cover and the substrate.

In an embodiment of the present invention, the arc extinguishing structure is disposed in the gap and located between the substrate and the metal structure.

In an embodiment of the present invention, the arc extinguishing structure includes a plurality of inorganic particles.

In an embodiment of the present invention, material of the arc extinguishing structure includes polysiloxanes.

In an embodiment of the present invention, the arc extinguishing structure includes a plurality of inorganic particles and a flux.

In an embodiment of the present invention, the protective device further includes at least one hole disposed in a portion of the substrate and the hole is corresponded to the gap of the electrode layer.

To achieve at least one of the above-mentioned advantages, another embodiment of the present invention provides a protective module which includes a circuit board, an overcurrent and overvoltage protective device and a protective film. The overcurrent and overvoltage protective device is disposed on the circuit board and includes a substrate, an electrode layer, a metal structure, an outer cover and an arc extinguishing structure. The substrate is disposed on the circuit board. The electrode layer is disposed on the substrate and includes at least one gap. The metal structure is disposed on the electrode layer and located above the gap. The outer cover is disposed on the substrate and covers the metal structure and a portion of the electrode layer. The arc extinguishing structure is disposed between the outer cover and the substrate. The protective film covers the overcurrent and overvoltage protective device and a portion of the circuit board.

In an embodiment of the present invention, since the protective device includes the arc extinguishing structure composed of the inorganic particles or made of polysiloxanes, the arc extinguishing effect is improved to induce less number of conductive objects, and moreover the conductive objects accumulated in the gap are isolated to prevent a broken circuit from being electrically conducted by the conductive objects. Moreover, in an embodiment of the present invention, the arc extinguishing structure disposed on the inner surface of the outer cover also can prevent electrically conduction paths from being formed between the electrodes and improve the insulation impedance between the electrodes. Furthermore, in an embodiment of the present invention, the hole disposed in the substrate can reduce the conductive paths between the electrodes. The conductive objects (such as carbon black, metal powder and so on) produced in the breaking capacity test for the protective device can be exhausted via the hole (such as through hole) or received in the hole (such as blind hole). It should be noted, the protective device can include both the hole and the arc extinguishing structure disposed in the gap.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
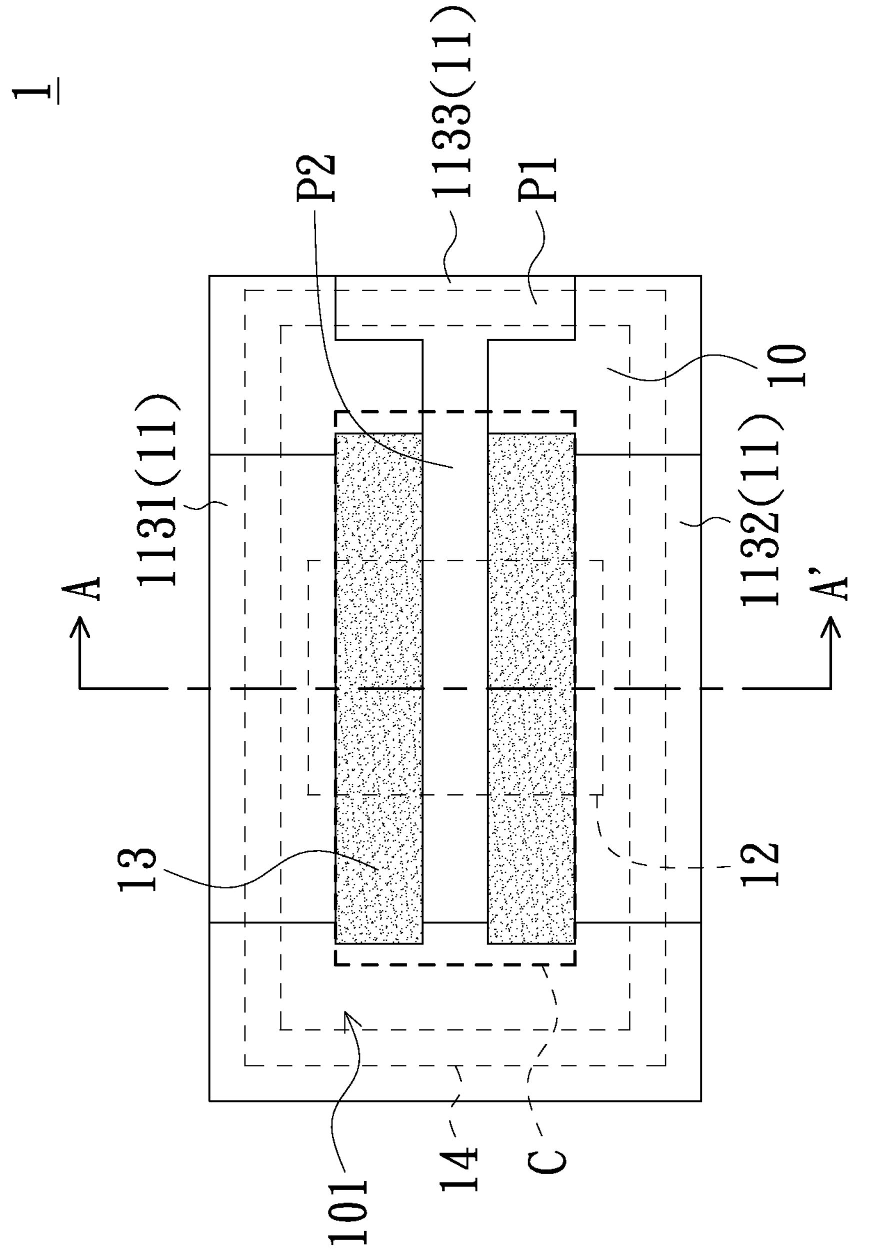
FIG. 1A is a schematic perspective top view of a protective device according to an embodiment of the present invention.
Figure 1B:
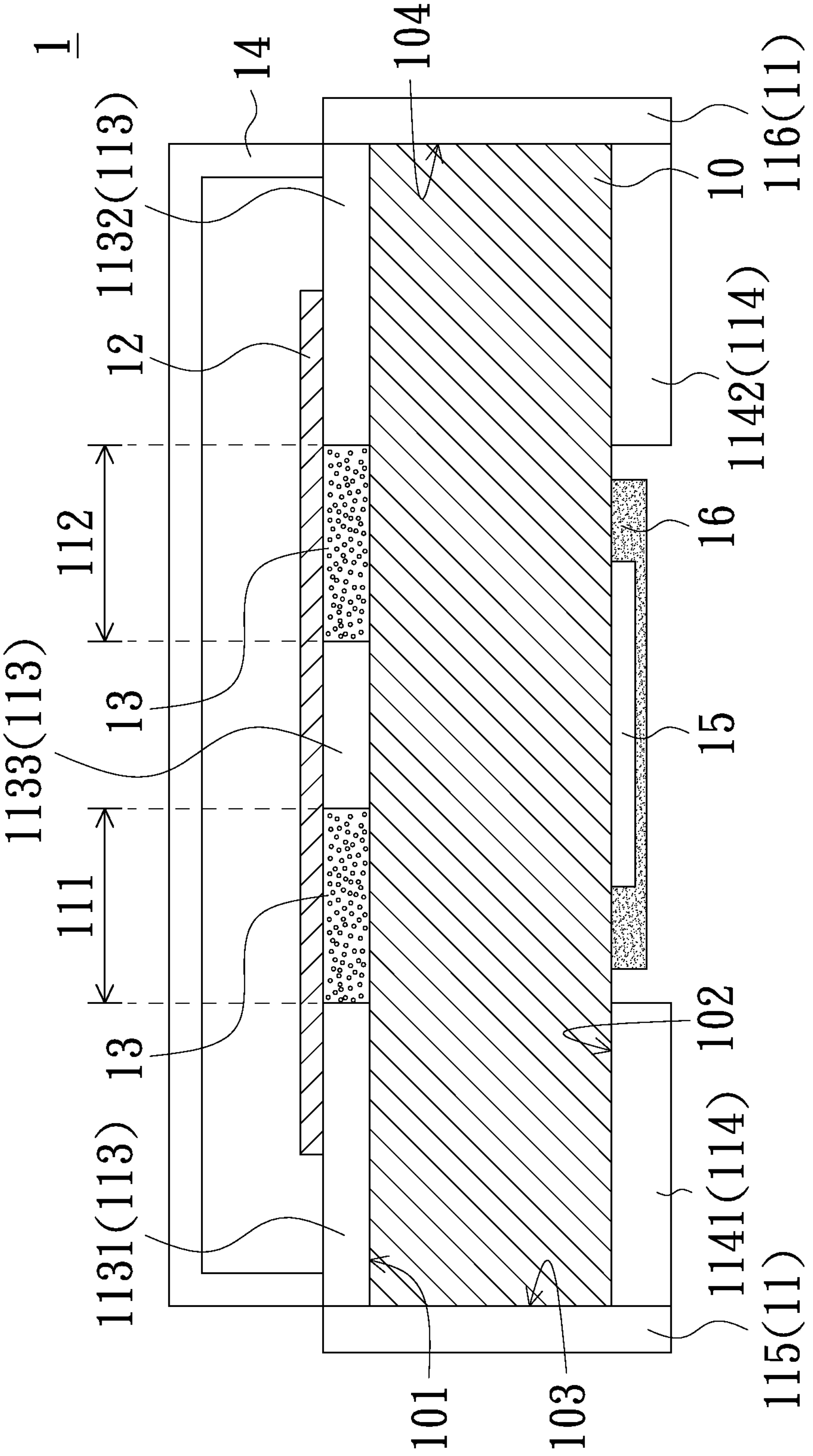
FIG. 1B is a schematic cross-sectional view taken along line A-A' in FIG. 1A.

FIG. 1A is a schematic perspective top view of a protective device according to an embodiment of the present invention, and FIG. 1B is a schematic cross-sectional view taken along line A-A' in FIG. 1A. Referring to FIGS. 1A and 1B, the protective device 1 of the present embodiment is, for example, a protective device with overcurrent and overvoltage protective function (OCP, OVP). The protective device 1 includes a substrate 10, an electrode layer 11, a metal structure 12, an arc extinguishing structure 13 and an outer cover 14. The electrode layer 11 is disposed on substrate 10, and the electrode layer 11 includes gaps 111, 112. In the present embodiment, the number of the gaps is, for example, but not limited to, two. The number of the gap can be changed according to design requirement. In other embodiments, the number of the gap can be one or more than two. The metal structure 12 is disposed on the electrode layer 11 and located above the gaps 111, 112. In the present embodiment, the metal structure 12 is, for example, made of alloy having a melting temperature lower than a melting temperature of the electrode layer 11. The alloy can be, but not limited to, tin-lead alloy, tin-silver-lead alloy, tin-indium-bismuth-lead alloy, tin-antimony alloy, tin-silver-copper alloy, or other alloy with low melting temperature. Moreover, the arc extinguishing structure 13 is disposed in the gaps 111, 112 and located between the metal structure 12 and the substrate 10. The outer cover 14 is disposed on the substrate 10 and covers the metal structure 12 and a portion of the electrode layer 11. The outer cover 14 may be tightly fixed on the substrate 10. Detailed structure of the protective device 1 of the present embodiment will be described hereinafter.

Referring to FIGS. 1A and 1B, the substrate 10 of the present embodiment has a first surface 101, a second surface 102 opposite to the first surface 101, a first side surface 103 and a second side surface 104 opposite to the first side surface 103, wherein each of the first side surface 103 and the second side surface 104 is connected between the first surface 101 and the second surface 102. The electrode layer 11 may include a first electrode layer 113, a second electrode layer 114, a third electrode layer 115 and a fourth electrode layer 116. The first electrode layer 113 is disposed on the first surface 101 of the substrate 10. The second electrode layer 114 is disposed on the second surface 102 of the substrate 10. The first electrode layer 113 includes a first side electrode 1131, a second side electrode 1132, and a middle electrode 1133 disposed between the first side electrode 1131 and the second side electrode 1132. The middle electrode 1133 is disposed on the first surface 101 and includes a base portion P1 and an intermediate support P2. The base portion P1 is located at a surface of the substrate 10, and the intermediate support P2 is connected to the base portion P1 and extended to overlap a central portion C of the substrate 10. The central portion C is surrounded by the first side electrode 1131, the second side electrode 1132 and the base portion P1. In addition, here it should be noted that the forms of the middle electrode 1133 are not limited in the embodiment.

Moreover, the second electrode layer 114 includes a third side electrode 1141 and a fourth side electrode 1142. The third side electrode 1141 and the fourth side electrode 1142 are respectively corresponded to the first side electrode 1131 and the second side electrode 1132. The third electrode layer 115 is disposed on the first side surface 103 and electrically connected to the first side electrode 1131 and the third side electrode 1141. The fourth electrode layer 116 is disposed on the second side surface 104 and electrically connected to the second side electrode 1132 and the fourth side electrode 1142. It should be noted that, in the present embodiment, although the third electrode layer 115 and the fourth electrode layer 116 are respectively disposed on the first side surface 103 and the second side surface 104, it does not limit the present invention. In another embodiment (not shown), the third electrode layer and the fourth electrode layer can be disposed in through holes of the substrate to be electrically connected to the first electrode layer and the second electrode layer, respectively. The gap 111 of the electrode layer 11 is located between the first side electrode 1131 and the middle electrode 1133, and the gap 112 of the electrode layer 11 is located between the second side electrode 1132 and the middle electrode 1133, thereby electrically separating the first side electrode 1131, the second side electrode 1132 and the middle electrode 1133. Moreover, the outer cover 14 is disposed above the substrate 10, the first side electrode 1131, the second side electrode 1132 and the middle electrode 1133 of the first electrode layer 113. The outer cover 14 is configured to accommodate the metal structure 12 and the arc extinguishing structure 13.

In the present embodiment, the arc extinguishing structure 13 is, for example, composed of a plurality of inorganic particles. In other words, the inorganic particles are filled in the gaps 111, 112 of the electrode layer 11 to form the arc extinguishing structure 13. The arc extinguishing structure 13 composed of the inorganic particles is configured to improve interrupting rating of the protective device 1, thereby promoting the arc extinguishing effect, increasing the insulation impedance between the electrodes, and avoiding a short circuit. In the present embodiment, material of the inorganic particles includes silicon dioxide ($SiO_2$), aluminum oxide ($Al_2O_3$), titanium dioxide ($TiO_2$), clay (e.g. montmorillonite, kaolin, talcum), metal oxide powder, or potter's clay. It should be noted that diameters of the inorganic particles filled in the gaps 111, 112 may be, but not limited to, smaller than 70 μm (micrometer). The standard of the breaking capacity of the protective device 1 depends on the specification of the protective device 1. The breaking capacity test is to simulate an arc occurring environment. The breaking capacity is a maximum probability of the protective device 1 capable of having a broken circuit resistance value between the first side electrode 1131 and the second side electrode 1132 greater than 1 MΩ when the arc occurs, wherein the maximum probability is, for example, greater than 50%. For example, the protective device 1 may have rated values such as a 12V withstanding voltage, a 7V heating voltage and a 1-2 A fusing current, etc. When performing the breaking capacity test, a current of 50 A and a voltage of 35V are applied to the first side electrode 1131 and the second side electrode 1132 which are electrically connected to the metal structure 12. The applied current is (or larger than) about 20-25 times of the rated fusing current, and the applied voltage is (or larger than) about 3 times of the rated withstanding voltage. In the above testing conditions, when the size of the inorganic particle is 70 μm (micrometer), the arcing time is about 520 μsec, and the probability of the protective device 1 capable of having the broken circuit resistance value greater than 1 MΩ is 50%; when the size of the inorganic particle is 40 μm, the arcing time is about 420 μsec and the probability of the protective device 1 capable of having the broken circuit resistance value greater than 1 MΩ is 80%; when the size of the inorganic particle is 1 μm, the arcing time is about 320 μsec and the probability of the protective device 1 capable of having the broken circuit resistance value greater than 1 MΩ is 100%. It should be understood according to above description, adding the inorganic particles can reduce the arcing time and the arcing probability, and therefore, when the arc occurs, the conductive objects produced in the gaps 111 and 112 can be reduced, and the probability of the broken circuit resistance value greater than 1 MΩ can be correspondingly increased.

In should be noted that using the inorganic particles filled in the gaps 111, 112 of the electrode layer 11 to form the arc extinguishing structure 13 is just one of the embodiments of the present invention. In another embodiment, the arc extinguishing structure 13 can be formed by filling polysiloxanes in the gaps 111, 112 of the electrode layer 11, so as to reduce energy caused by arcing effect and avoid a short circuit caused by sputter of the conductive objects which are produced by the arcing effect. The polysiloxanes may be, but not limited to, polydimethylsiloxane (PDMS), polyvinylsiloxane (PVS), and so on. In another embodiment, the arc extinguishing structure 13 is, for example, formed by filling the inorganic particles and a flux (welding flux) in the gaps 111, 112 of the electrode layer 11, so as to effectively facilitate melting of the metal structure and improve the arc extinguishing effect. Material of the flux may include resin, rosin or the like. The melting temperature of the flux is lower than a melting temperature of the metal structure 12, and the melting points of inorganic particles are higher than the metal structure 12. The flux can remove metal oxide on the surface of the metal structure 12 and decrease the surface tension of the melted metal structure, such that the melted metal can efficiently spread to the electrodes at two sides. The inorganic particles can reduce adhesive force of the conductive objects such as carbon black and metal powder produced in a breaking capacity test, for example, testing current 50 A of the electrode of protective device 1 is greater than 50 times of rated voltage 12V and testing voltage 36V of the electrode of protective device 1 is greater than 3 times of rated voltage 12V, thereby reducing the fusing time of the metal structure 12. The inorganic particles added in the gaps 111, 112 can extinguish the arc within the shorter time and generate less heat resulting in inducing less the conductive objects such as carbon black and metal powder. Furthermore, the inorganic particles can reduce the amount of the conductive objects such as carbon black and metal powder produced in a breaking capacity test to reduce an arcing effect, since breaking capacity of the protective device 1 can be increased. In the embodiment that the inorganic particles and the flux are filled in the gaps 111, 112, when a sum of a weight of the inorganic particles and a weight of the flux is represented by A, the weight of the inorganic particles is greater than $\frac{1}{20}$A. In other words, the weight of the inorganic particles is greater than 5% of the sum of the weights of the inorganic particles and the flux.

Figure 1C:
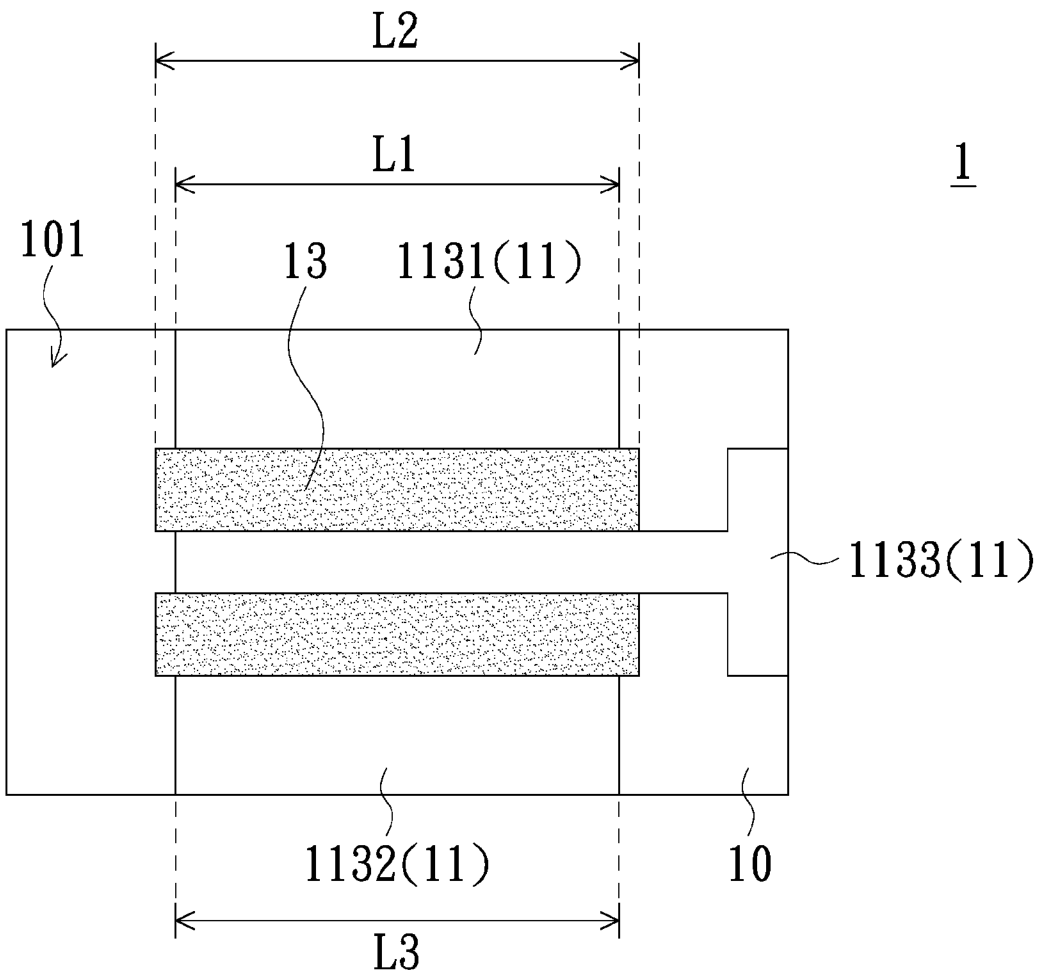
FIG. 1C is a schematic view showing a length relationship between an arc extinguishing structure and an electrode layer of FIGS. 1A and 1B.

FIG. 1C is a schematic view showing a length relationship between an arc extinguishing structure and an electrode layer of FIGS. 1A and 1B. Referring to FIG. 1C, in the present embodiment, the arc extinguishing structure 13 formed in the gaps 111, 112 of the electrode layer 11 has a length L2, and the length L2 may be, but not limited to, greater than a length L1 of the first side electrode 1131 and a length L3 of the second side electrode 1132 so as to improve the insulation impedance between the electrodes after performing the breaking capacity test, thereby avoiding the short circuit. In FIG. 1C, in order to obviously show the length L2 of the arc extinguishing structure 13 being greater than the length L1 of the first side electrode 1131 and the length L3 of the second side electrode 1132, only some necessary elements are shown in FIG. 1C, and some elements are omitted in FIG. 1C.

Figure 1D:
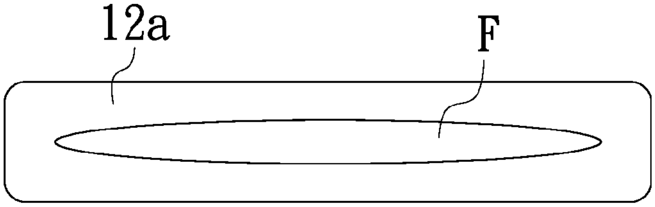
FIG. 1D shows a different structure of the metal structure in FIG. 1A.

Referring to FIGS. 1A and 1B, the protective device 1 of the present embodiment may further include a heater 15 and an insulation protective layer 16. The heater 15 is disposed between the third side electrode 1141 and the fourth side electrode 1142 of the second electrode layer 114, and the heater 15 is electrically connected to the middle electrode 1133 of the first electrode layer 113. In the present embodiment, material of the heater 15 may be, but not limited to, resistance material such as ruthenium dioxide ($RuO_2$) or carbon black. Moreover, the heater 15 may be electrically connected to an external driving device (not shown). The external driving device can drive the heater 15 to heat the metal structure 12 so as to melt the metal structure 12. In order to protect the heater 15 from being damaged by follow-up process, external moisture, external acid environment and external alkali environment, the insulation protective layer 16 is disposed to cover the heater 15 and between the third side electrode 1141 and the fourth side electrode 1142 of the second electrode layer 114. Material of the insulation protective layer 16 may include, but not limited to, glass adhesive or epoxy resin. It should be noted that, in the present embodiment, the heater 15 and the metal structure 12 are disposed at different sides of the substrate 10, but the present invention is not limited to the configuration. In another embodiment, the heater 15 and the metal structure 12 can be disposed on a same side of the substrate 10. Moreover, in another embodiment, an auxiliary medium F (shown by FIG. 1D) including the inorganic particles and/or the flux can be embedded in the metal structure 12*a*, so as to help blow the metal structure 12*a* by heat and to extinguish the arc within the shorter time resulting in inducing less conductive objects and increase the breaking capacity of the protective device.

Figure 2:
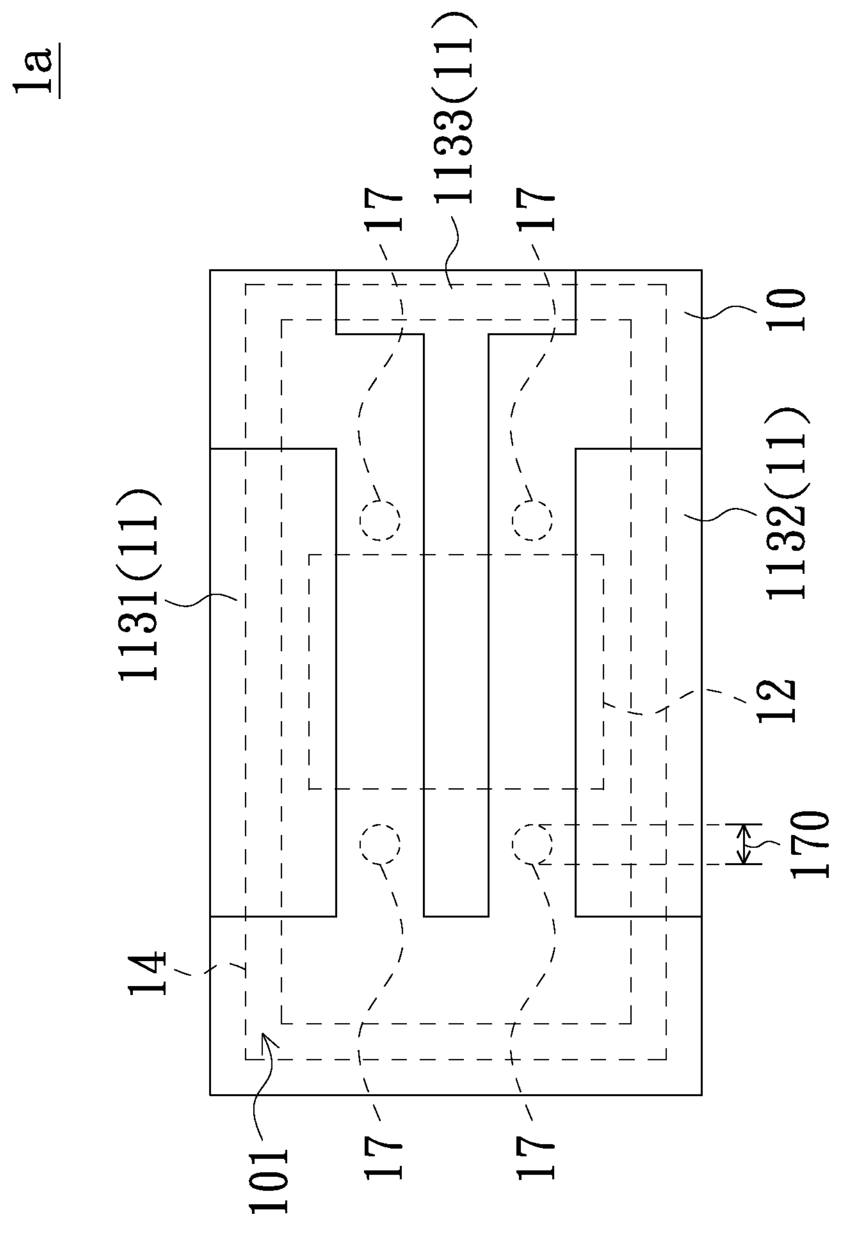
FIG. 2 is a schematic top view of a protective device according to another embodiment of the present invention.

FIG. 2 is a schematic top view of a protective device according to another embodiment of the present invention. Referring to FIG. 2, the protective device 1*a* of the present embodiment is similar to the protective device 1 shown in FIGS. 1A to 1C, the difference is that the protective device 1*a* further includes holes such as through holes 17, and the arc extinguishing structure 13 shown in FIGS. 1A to 1C is omitted in FIG. 2. In the present embodiment, the number of the through holes 17 is, for example, four. However, the number of the through holes 17 can be increased or decreased according to design requirement, and the present invention does not limit the number of the through hole 17. The through holes 17 are disposed in substrate 10 and may be located in a portion of the substrate 10 exposed from the electrode layer 11. The through holes 17 are corresponded to the gaps 111, 112 of the electrode layer 11. More specifically, the through holes 17 are disposed between the first side electrode 1131 and the middle electrode 1133 and between the second side electrode 1132 and the middle electrode 1133. Moreover, the through holes 17 respectively have an opening 170. In order to prevent the substrate 10 from being cracked, a diameter of the opening 170 should not be too large. In a preferred embodiment, the diameter of the opening 170 may be, but not limited to, smaller than 400 μm. In the present embodiment, the conductive objects such as carbon black and metal powder produced in the breaking capacity test for the protective device 1*a* can be exhausted from the through holes 17, thereby improving the insulation impedance between the electrodes. Therefore, in the present embodiment, it does not need to dispose through holes in the outer cover 14 to exhaust the conductive objects such as carbon black and metal powder. It should be noted that, in another embodiment, the protective device can include both the arc extinguishing structure 13 (as shown in FIGS. 1A to 1C) disposed in the gaps 111, 112 and the through holes 17 to improve the arc extinguishing effect and the insulation impedance. Moreover, the thorough holes 17 can be replaced by blind holes. The conductive objects such as carbon black and metal powder produced in the breaking operation (overcurrent and/or overvoltage) for the protective device can be received in the blind holes, thereby improving the insulation impedance between the electrodes so as to increase the breaking capacity of the protective device.

Figure 3:
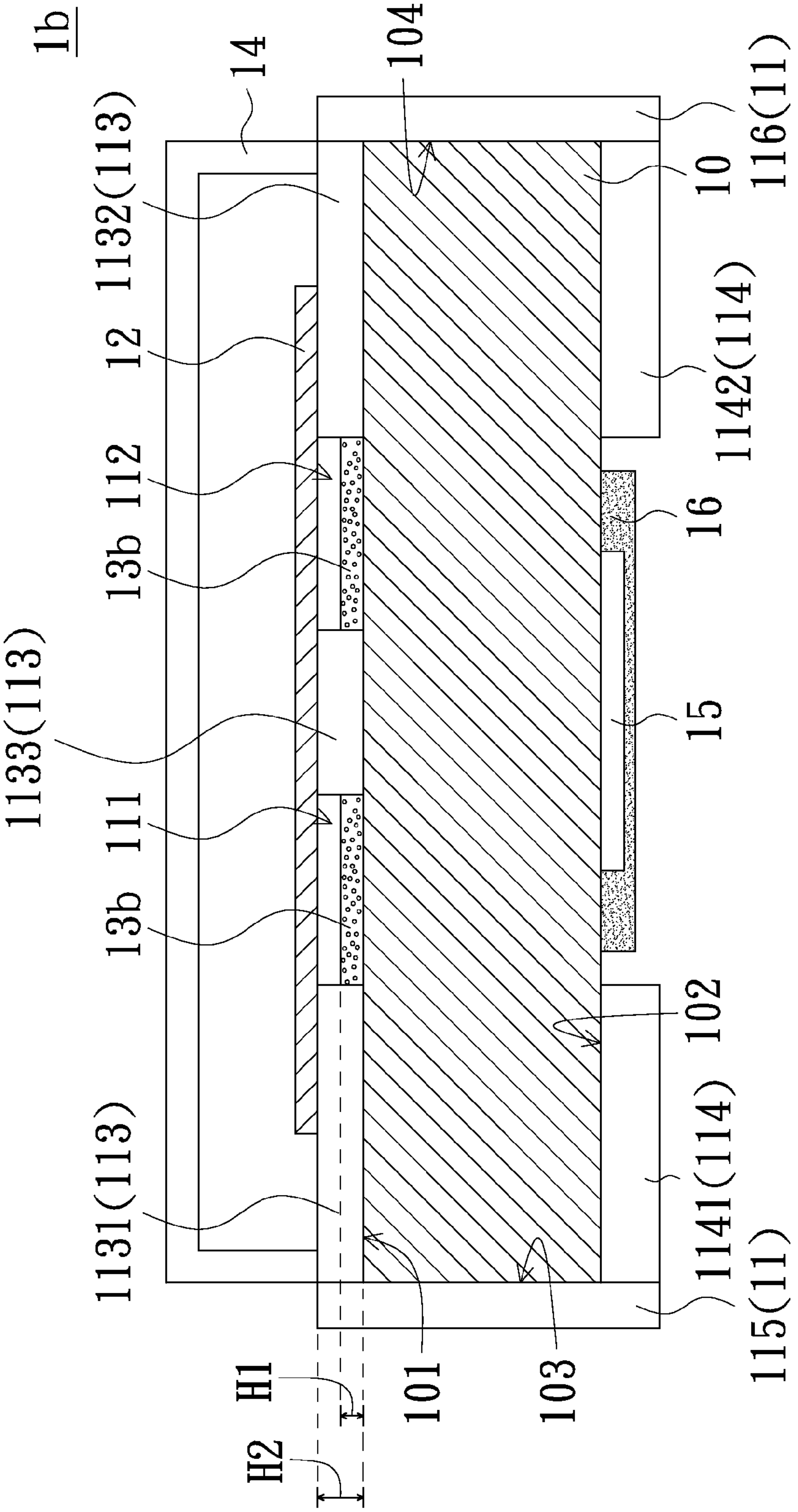
FIG. 3 is a schematic cross-sectional view of a protective device according to another embodiment of the present invention.
Figure 4:
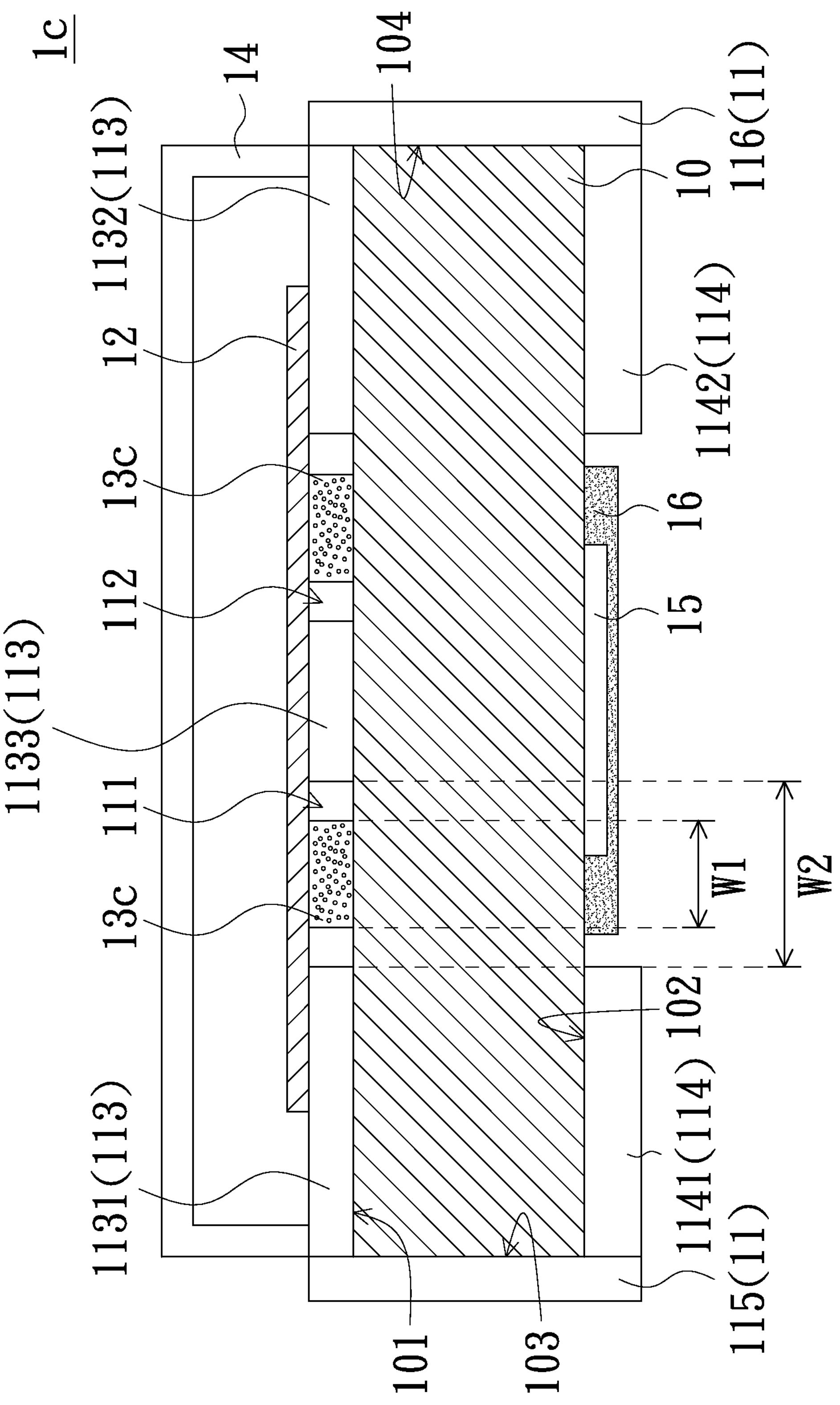
FIG. 4 is a schematic cross-sectional view of a protective device according to another embodiment of the present invention.

FIG. 3 is a schematic cross-sectional view of a protective device according to another embodiment of the present invention. Referring to FIG. 3, the protective device 1*b* of the present embodiment is similar to the protective device 1 shown in FIGS. 1A to 1C, the difference is that, in the present embodiment, a height H1 of the arc extinguishing structure 13*b* is, for example, smaller than a height H2 of the first electrode layer 113. In this configuration, the arc can be extinguished within the shorter time and the amount of inorganic particles or polysiloxanes filled in the gaps 111, 112 can be reduced to decrease the manufacturing cost of the protective device 1. In another embodiment shown in FIG. 4, a width W1 of the arc extinguishing structure 13*c* of the protective device 1*c* is, for example, smaller than a width W2 of the gap 111. The protective devices 1*b*, 1*c* have similar advantages. It should be noted that the width and the height of the arc extinguishing structure can be changed according to design requirement. In FIG. 3, only the height of the arc extinguishing structure 13*b* is adjusted, and in FIG. 4, only the width of the arc extinguishing structure 13*c* is adjusted. However, in another embodiment, both the height and the width of the arc extinguishing structure can be adjusted.

Figure 5:
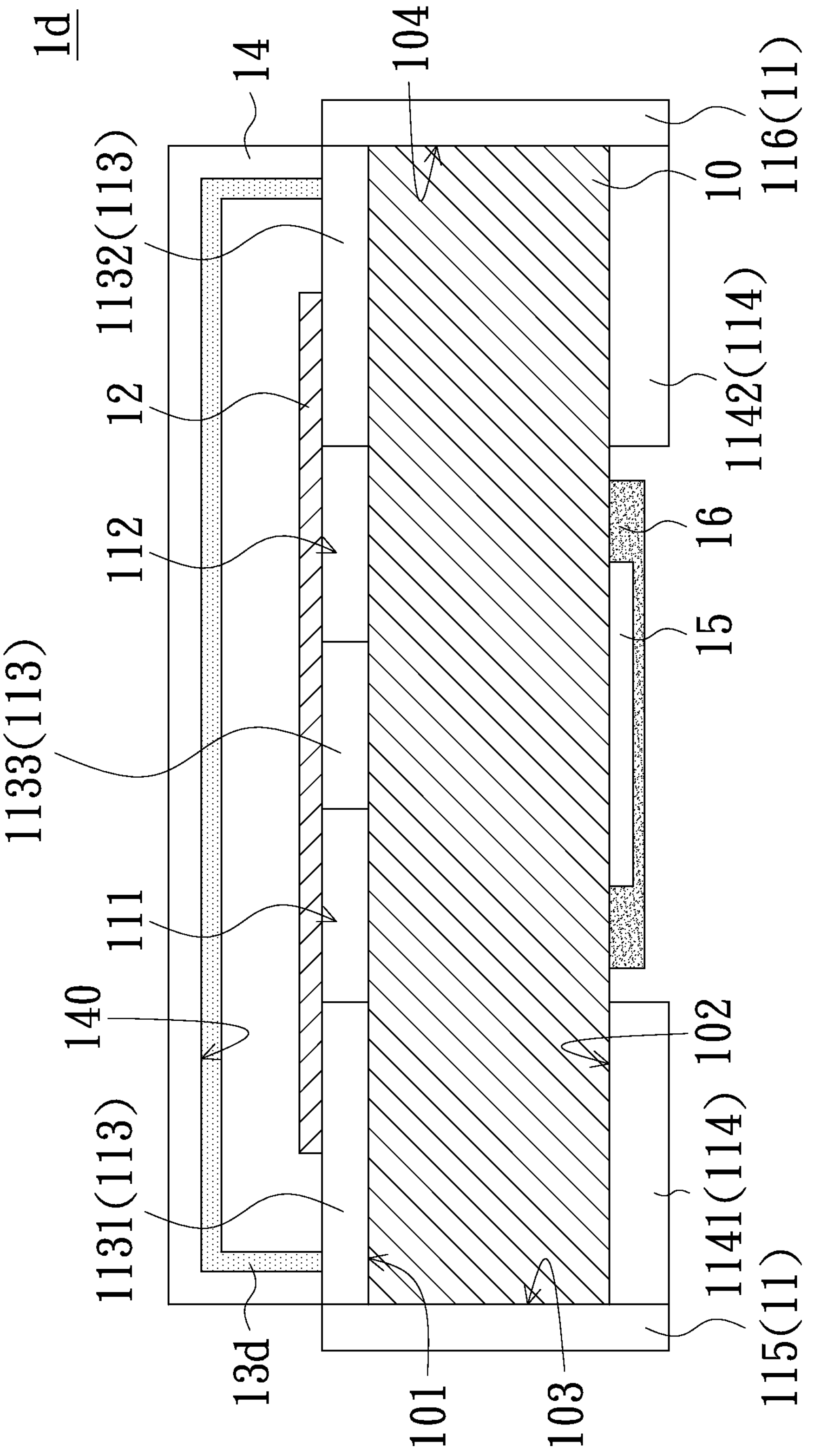
FIG. 5 is a schematic cross-sectional view of a protective device according to another embodiment of the present invention.

FIG. 5 is a schematic cross-sectional view of a protective device according to another embodiment of the present invention. Referring to FIG. 5, the protective device 1*d* of the present embodiment is similar to the protective device 1 shown in FIGS. 1A to 1C, the difference is that, in the present embodiment, the arc extinguishing structure 13*d* is disposed on an inner surface 140 of the outer cover 14 facing to the gaps 111, 112. Material of the arc extinguishing structure 13*d* may include pressure sensitive adhesive (PSA) such as silicone PSA, or polysiloxanes such as polydimethylsiloxane (PDMS), polyvinyl siloxane (PVS). In a preferred embodiment, the silicone PSA or other PSA with adhesive strength ranged from 10 g/mm$^2$ to 50 g/mm$^2$ is used, or the polysiloxanes with viscosity ranged from 800 cps to 1000 cps is used. When the metal structure 12 is melted, because of the high temperature, some of the inorganic particles on the outer cover 14 may drop to the melted metal structure 12, and a portion of the melted metal structure 12 may scatter to the outer cover 14 and then adhere to the outer cover 14, so as to extinguish the arc within the shorter time resulting in inducing less conductive objects and increase the breaking capacity of the protective device. In the present embodiment, disposing the arc extinguishing structure 13*d* on the inner surface 140 of the outer cover 14 can efficiently prevent electrically conduction paths from being formed between the electrodes and improve the insulation impedance between the electrodes. It should be noted that, since the arc extinguishing structure 13*d* of the protective device 1*d* is disposed on the inner surface 140 of the outer cover 14, the flux (not shown) can be filled in the gaps 111, 112 in a preferred embodiment.

Figure 6A:
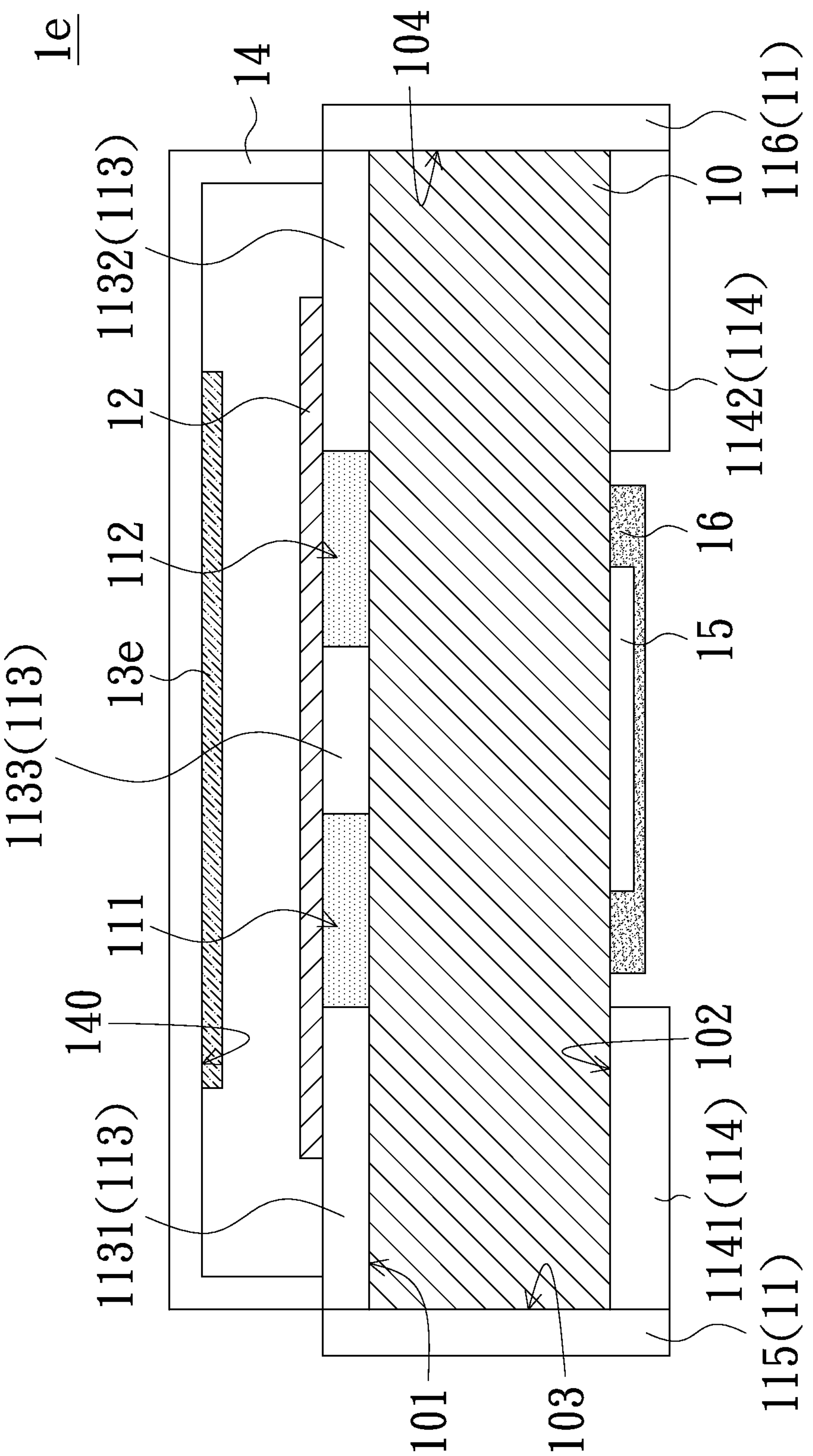
FIG. 6A is a schematic cross-sectional view of a protective device according to another embodiment of the present invention.
Figure 6B:
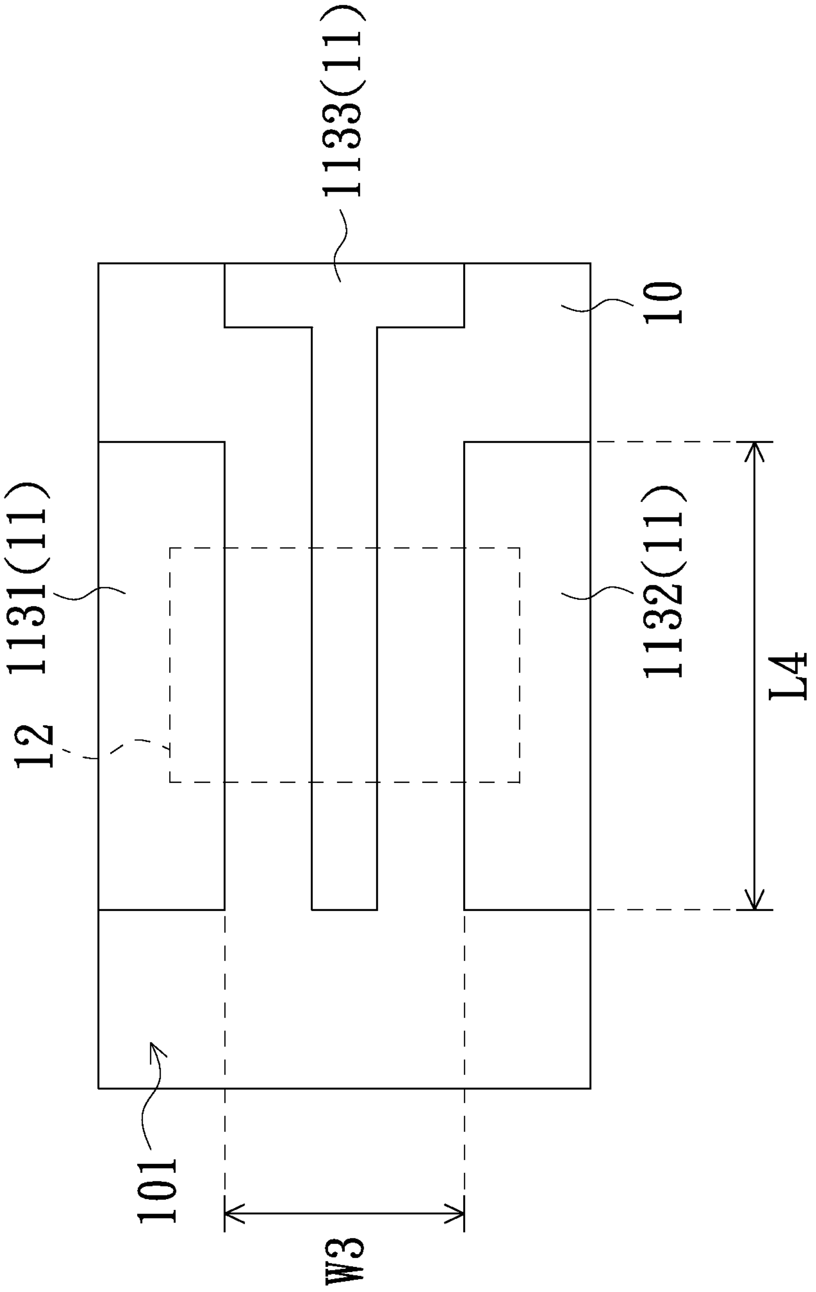
FIGS. 6B and 6C are schematic views showing relationships between lengths and widths of an arc extinguishing structure and an electrode layer of FIG. 6A.
Figure 6C:
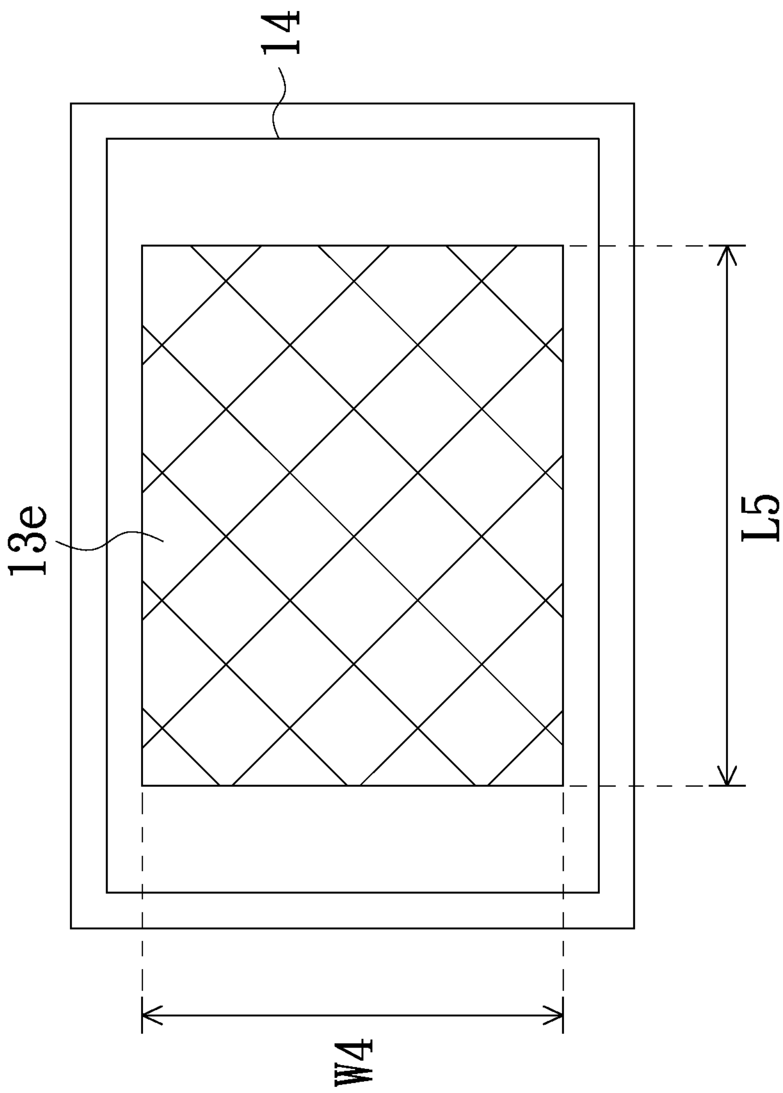

Although the arc extinguishing structure 13*d* shown in FIG. 5 is disposed on the entire inner surface 140 of the outer cover 14, the present invention is not limited to this configuration. In another embodiment, the arc extinguishing structure can be disposed on a portion of the inner surface 140 of the outer cover 14. For example, referring to FIG. 6A, the arc extinguishing structure 13*e* of the protective device 1*e* is disposed on a portion of the inner surface 140 corresponding to the gaps 111, 112, and a portion of the arc extinguishing structure 13*e* is disposed in the gaps 111, 112 by filling the inorganic particles and/or the flux in the gaps 111, 112. In the present embodiment, referring to FIGS. 6B and 6C, a width W4 of the arc extinguishing structure 13*e* is, for example, greater than a width W3 between the first side electrode 1131 and the second side electrode 1132. A length L5 of the arc extinguishing structure 13*e* is, for example, greater than a length L4 of the first side electrode 1131 or the second side electrode 1132. Moreover, the outer cover 14 is omitted in FIG. 6B in order to clearly show the length and width relationships between the arc extinguishing structure 13*e*, the first side electrode 1131 and the second side electrode 1132.

Figure 7:
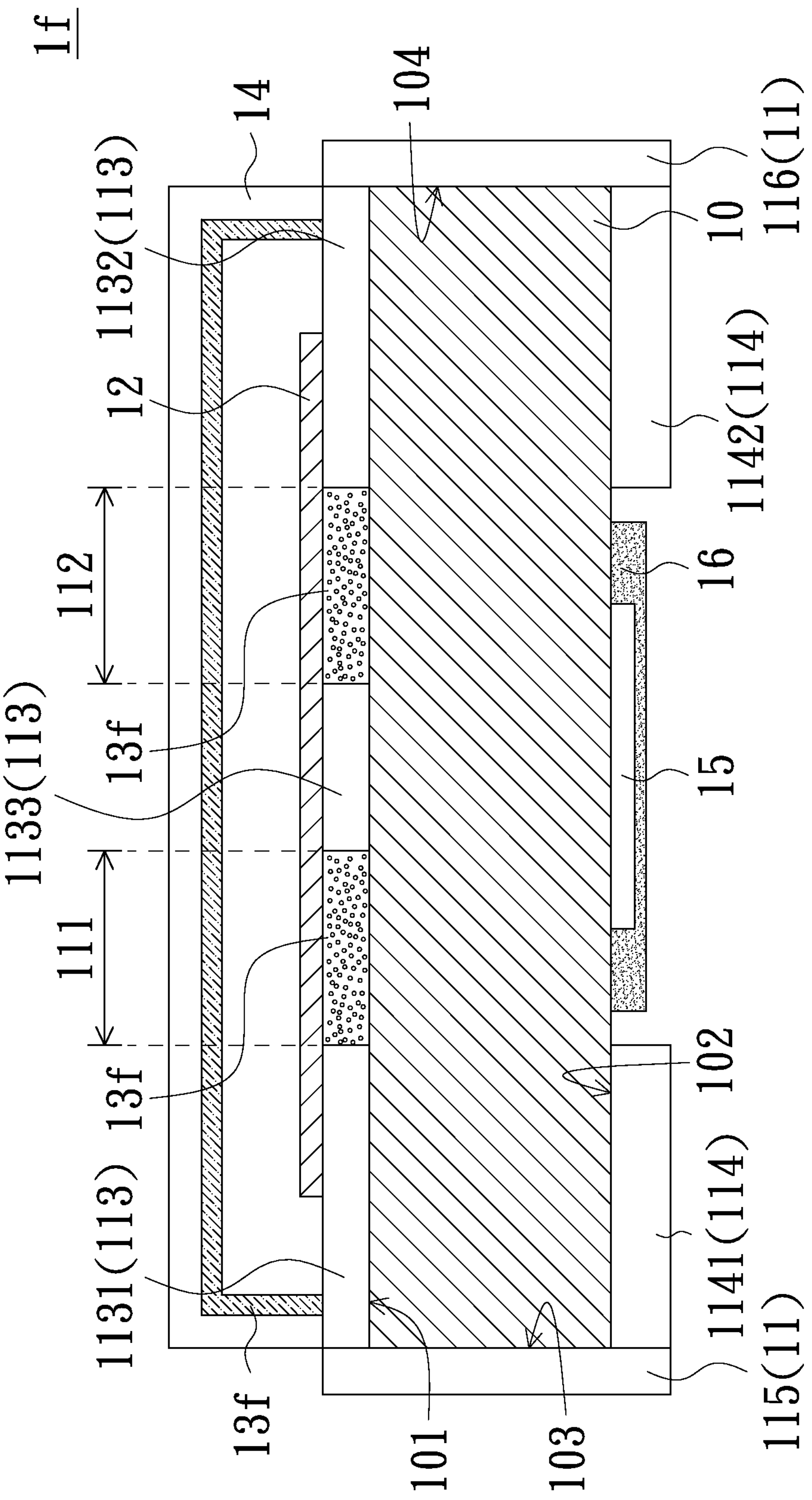
FIG. 7 is a schematic cross-sectional view of a protective device according to another embodiment of the present invention.

FIG. 7 is a schematic cross-sectional view of a protective device according to another embodiment of the present invention. Referring to FIG. 7, the protective device 1*f* of the present embodiment is similar to the protective device 1 shown in FIG. 1, the difference is that, in the present embodiment, the arc extinguishing structure 13*f* is disposed not only on the outer cover 14 but also in the gaps 111, 112 of the electrode layer 11. More specifically, material of a portion of arc extinguishing structure 13*f* disposed on the outer cover 14 may include PSA (such as silicone PSA) or polysiloxanes. Another portion of the arc extinguishing structure 13*f* disposed in the gaps 111, 112 may be composed of the inorganic particles, composed of the inorganic particles and the flux, or made of polysiloxanes.

Figure 8:
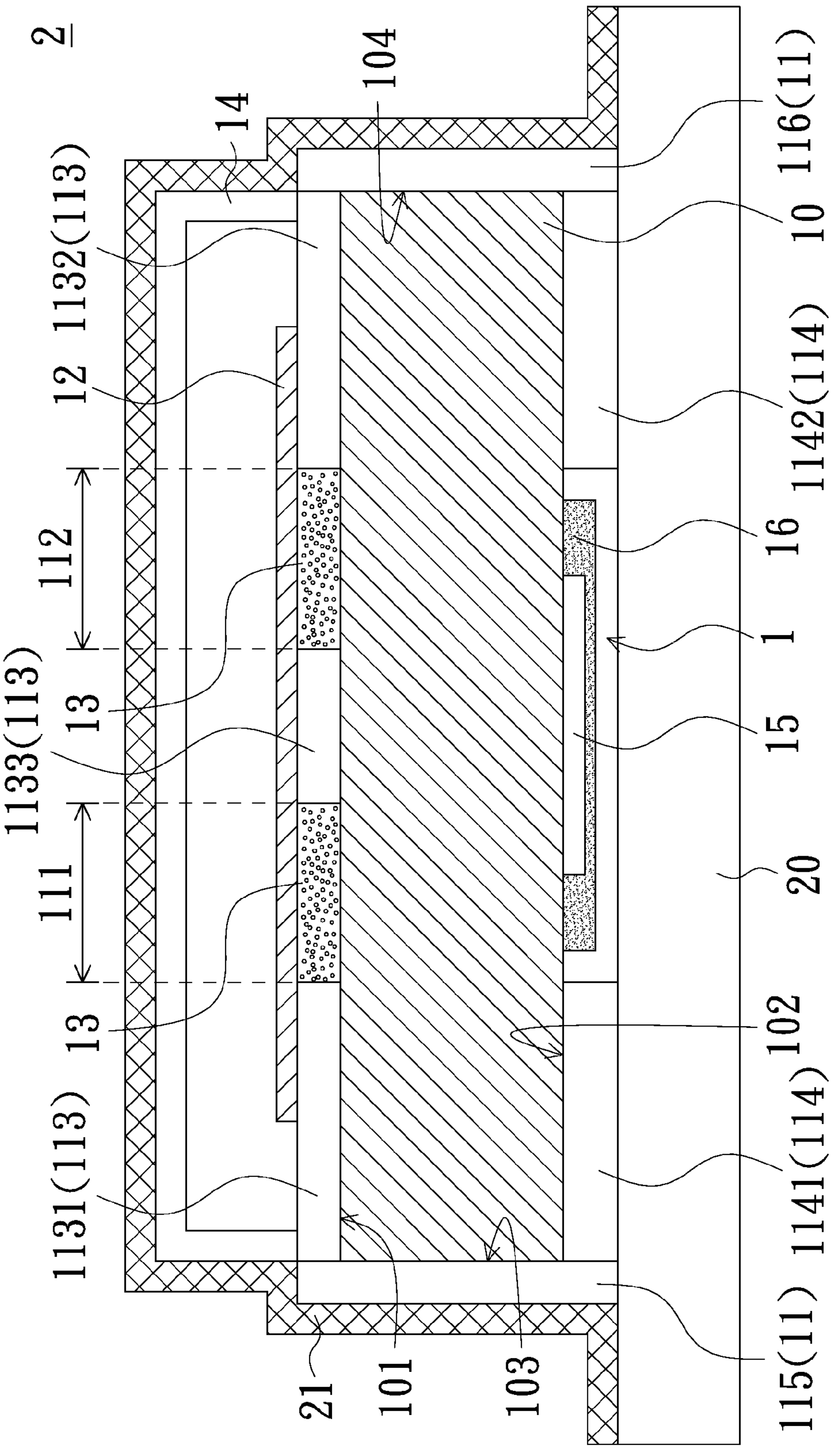
FIG. 8 is a schematic cross-sectional view of a protective module according to another embodiment of the present invention.

FIG. 8 is a schematic cross-sectional view of a protective module according to another embodiment of the present invention. Referring to FIG. 8, the protective module 2 of the present embodiment includes a circuit board 20, a protective film 21 and the protective device 1 with overcurrent and overvoltage protective function shown in FIGS. 1A to 1C. The protective device 1 is disposed on the circuit board 20. The protective film 21 covers the protective device 1 and a portion of the circuit board 20. Specifically, the protective film 21 covers the protective device 1 and extends to connect the circuit board 20, and the protective device 1 is entirely covered by the protective film 21 and the circuit board 20. Therefore, the protective device 1 is isolated from external air. A thickness of the protective film 21 is, for example, between 30 μm and 210 μm. The protective film 21 can be formed by coating materials such as thermoplastic and thermosetting materials. In the present embodiment, since the protective device 1 includes the arc extinguishing structure 13 and/or the substrate 10 includes the holes such as through holes 17 (as shown in FIG. 2) or blind holes, openings in the outer cover 14 can be omitted. In this configuration, the protective device 1 can by perfectly protected by the protective film 21, thereby preventing the protective device 1 from being damaged by external moisture or filth.

Referring to FIGS. 9A, 9B, 9C, and 9D, according to another embodiment of the present invention, a protective device is provided. The protective device 200 of the present embodiment includes a substrate 210, an electrode layer, a heater 260, an arc extinguishing structure 270, and a conductive section. The electrode layer may include a first electrode 220, a second electrode 230, a third electrode 240 (including the middle electrode on the first electrode layer) and a fourth electrode 250. The first electrode 220, the second electrode 230, the third electrode 240, and the fourth electrode 250 are respectively disposed on the substrate 210. Herein, the conductive section is supported by the substrate 210 and includes a metal structure 280 electrically connected between the first electrode 220 and the second electrode 230. The metal structure 280 serves as a sacrificial structure having a melting temperature lower than that of the first electrode 220 and the second electrode 230.

In detail, in the present embodiment, the substrate 210 includes a central portion C, a first peripheral portion 212, a second peripheral portion 214, a third peripheral portion 216, and a fourth peripheral portion 218, wherein the central portion C is surrounded by the first peripheral portion 212, the second peripheral portion 214, the third peripheral portion 216, and the fourth peripheral portion 218. The first peripheral portion 212 is disposed corresponding to the second peripheral portion 214, and the third peripheral portion 216 is disposed corresponding to the fourth peripheral portion 218. The first electrode 220, the second electrode 230, the third electrode 240 and the fourth electrode 250 are respectively disposed on the first peripheral portion 212, the second peripheral portion 214, the third peripheral portion 216, and the fourth peripheral portion 218. The substrate 210 has a first surface S1 and a second surface S2 opposite thereto. The first electrode 220, the second electrode 230, the third electrode 240, and the fourth electrode 250 all extend from the first surface S1 to the second surface S2. However, the present invention is not limited thereto, each of the electrodes can be disposed or not disposed on the first surface S1 or the second surface S2 as required. In another embodiment, the fourth electrode 250 can be disposed on the second surface S2 only.

Furthermore, according to the present embodiment, an intermediate support 242 and a second extending portion 244 of the third electrode 240 are respectively disposed on the first surface S1 and the second surface S2, and respectively extend to a location overlapping the central portion C. According to the present embodiment, the intermediate support 242 and the second extending portion 244 are respectively disposed on two planes which are substantially parallel but do not overlap with each other. A third extending portion 252 of the fourth electrode 250 is disposed on the second surface S2 and extends to a location overlapping the central portion C. The intermediate support 242, the second extending portion 244, and the third extending portion 252 are respectively disposed between the first electrode 220 and the second electrode 230. In addition, here it should be noted that the forms of the intermediate support 242 are not limited in the invention, the intermediate support may be an independent part on the substrate without contact with the electrodes, and include a material having a good thermal conductivity to facilitate breaking of the metal structure upon melting.

A material of the substrate 210 includes ceramic, glass epoxy resin, aluminum oxide ($Al_2O_3$), zirconium oxide ($ZrO_2$), silicon nitride ($Si_3N_4$), aluminum nitride (AlN), boron nitride (BN), or other inorganic materials, for example. A material of the first electrode 220, the second electrode 230, the third electrode 240, and the fourth electrode 250 is, for example, silver, copper, gold, nickel, silver-platinum alloy, silver-palladium, nickel alloy and other material with good electrical conductivity.

Figure 9A:
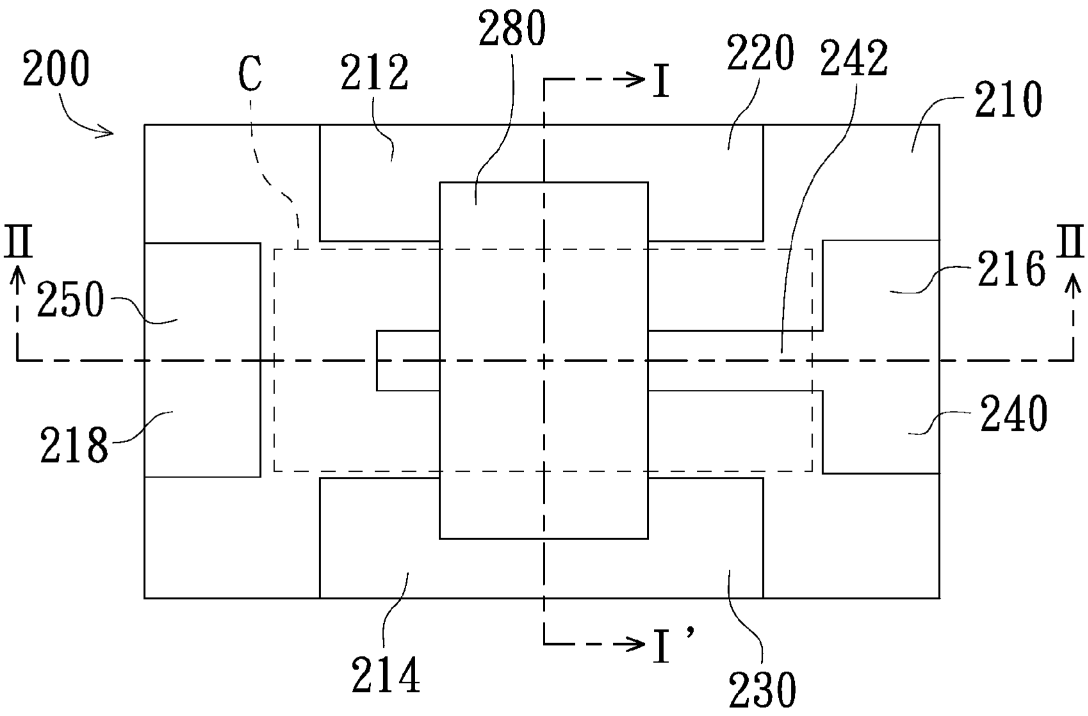
FIG. 9A is a top view of a protective device according to one embodiment of the present invention.
Figure 9B:
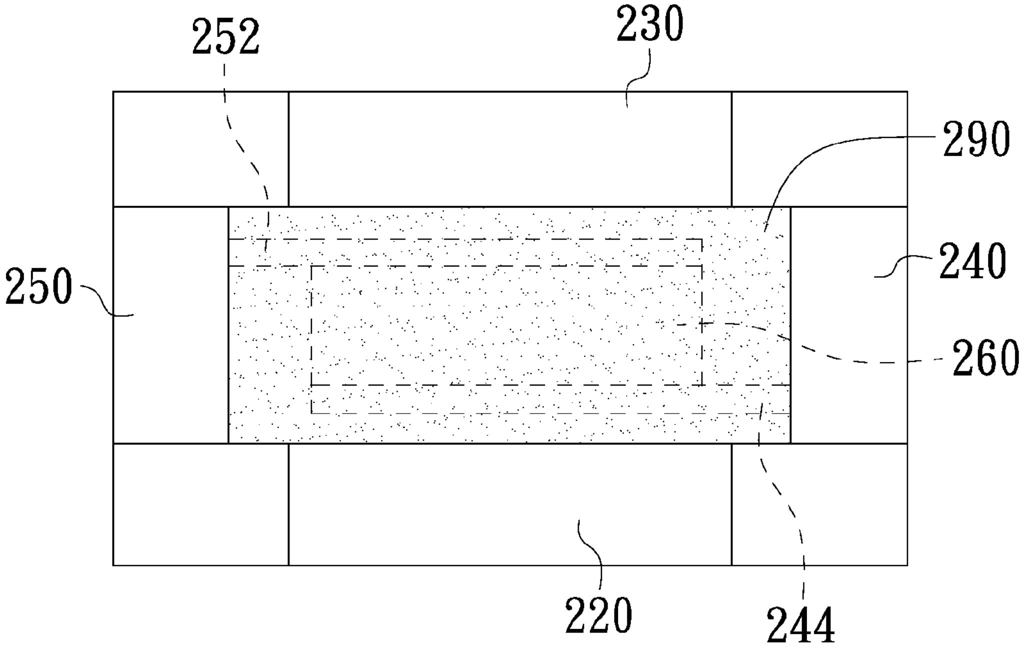
FIG. 9B is a bottom view of the protective device shown in FIG. 1A.
Figure 9C:
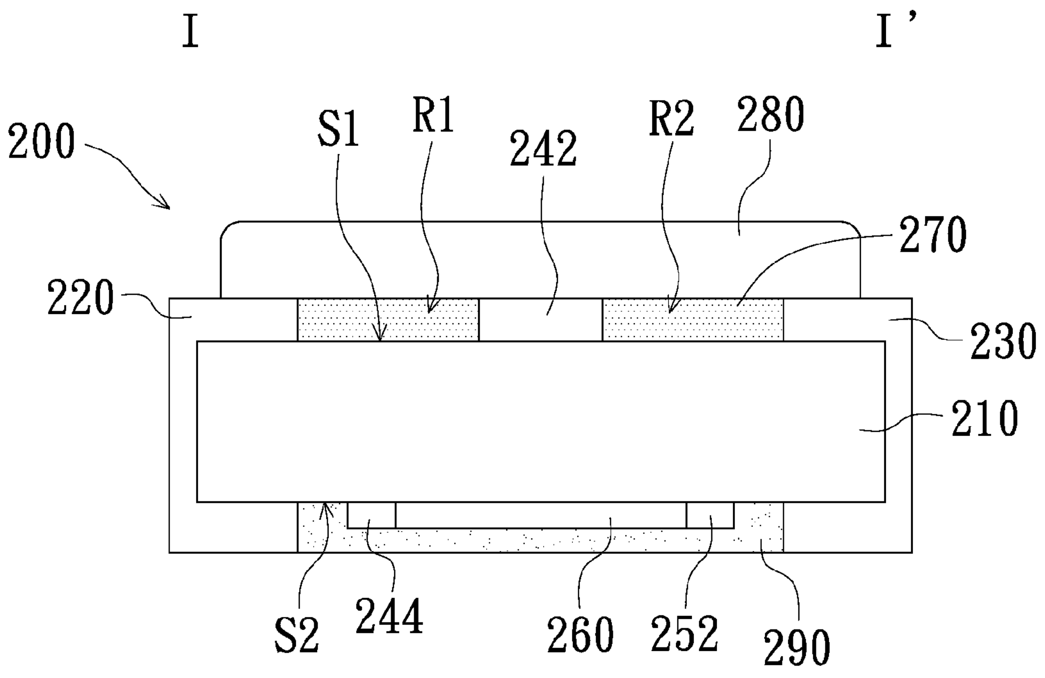
FIG. 9C is a cross-sectional view illustrating the protective device along a sectional line I-I' in FIG. 9A.
Figure 9D:
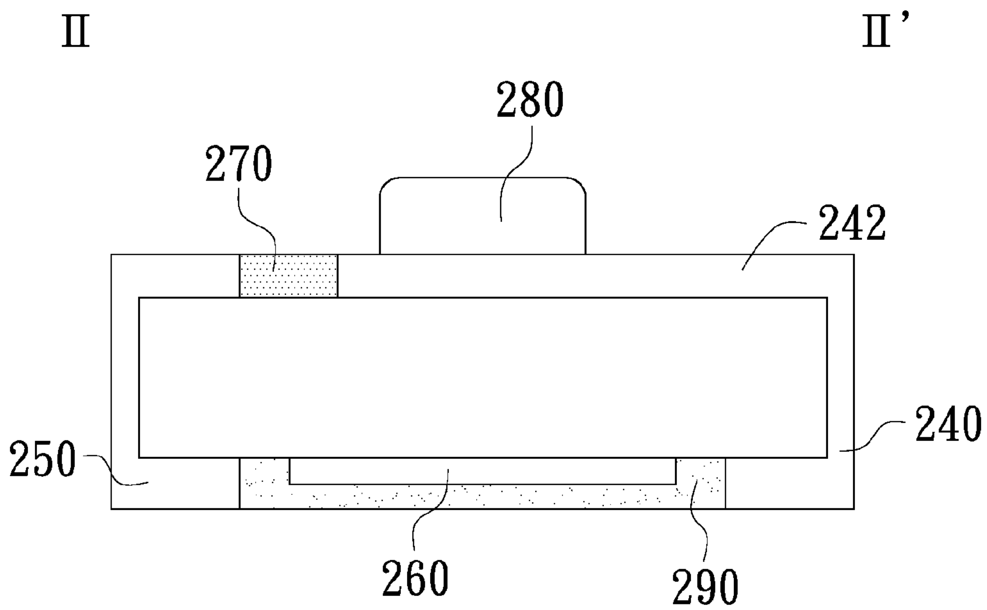
FIG. 9D is a cross-sectional view illustrating the protective device along a sectional line II-IP in FIG. 9A.

The heater 260 is disposed on the second surface S2 and connected between the second extending portion 244 and the third extending portion 252, wherein the intermediate support 242 of the third electrode 240 is disposed over the heater 260 (as shown in FIG. 9C). A material of the heater 260 includes ruthenium dioxide ($RuO_2$), carbon black doped in an inorganic adhesive, copper, titanium, nickel-chromium alloy, and nickel-copper alloy with some glass and some conductive materials such as silver, platinum, and palladium, for example. Moreover, in order to protect the heater 260 from being affected by subsequent manufacturing process and humidity, acidity and alkalinity of the ambient environment, the heater 260 is covered by an insulating layer 290 made of glass or epoxy resin.

The arc extinguishing structure 270 is disposed on the first surface S1 of the substrate 210 and around the intermediate support 242, wherein the arc extinguishing structure 270 is located between the metal structure 280 and the substrate 210. In detail, according to the present embodiment, the arc extinguishing structure 270 is disposed among the first electrode 220, the second electrode 230, and the intermediate support 242. Specifically, the arc extinguishing structure 270 is filled in a first trench R1 formed by the first electrode 220, the intermediate support 242 and the substrate 210, and is filled in a second trench R2 formed by the second electrode 230, the intermediate support 242, and the substrate 210. In other words, the arc extinguishing structure 270 is disposed between on either side of the intermediate support 242. In the embodiment that the arc extinguishing structure 270 includes the inorganic particles and the flux, the arc extinguishing structure 270 has a melting temperature lower than that of the metal structure 280, and the arc extinguishing structure 270 facilitates breaking of the metal structure 280 upon melting to extinguish the arc within the shorter time. In another embodiment that the arc extinguishing structure 270 includes the inorganic particles but does not include the flux, the arc extinguishing structure 270 has a melting temperature higher than that of the metal structure 280. For example, when the inorganic particles are silica particles, the melting temperature of the arc extinguishing structure 270 is about 1600° C., and the melting temperature of the metal structure 280 is about 260-300° C.

The metal structure 280 is disposed on the first electrode 220, the intermediate support 242 and the second electrode 230 and covers a portion of the arc extinguishing structure 270, wherein the arc extinguishing structure 270 and the intermediate support 242 are both disposed between the heater 260 and the metal structure 280

A material of the metal structure 280 includes tin-lead alloy, tin-silver-lead alloy, tin-indium-bismuth-lead alloy, tin-antimony alloy, tin-silver-copper alloy, and other alloy with a low melting temperature. It should be noted that, although the present invention is described using a protective device having the heater to simultaneously achieve the over voltage protection and the over current protection, persons of ordinary skill in the art should know that the feature of disposing the arc extinguishing structure 270 below the metal structure 280 to facilitate the stability of effectively blowing the metal structure 280 can also be applied to a structure having no heater to facilitate the stability of blowing the metal structure 280 when an over current occurs to cause the metal structure 280 to be melted by self-generating heat. Further, the over voltage protection is achieved when the heating current flows to the heater 260 and metal structure 280 and thus the metal structure 280 is melted due to the heat from the heater 260. The over current protection is achieved when the current only flows to the metal structure 280, and the metal structure 280 is melted by self-generating heat.

In another embodiment, the third electrode may be an independent part on the substrate without contact with other electrodes. That is, the third electrode electrically connected to a heater 260 does not have the intermediate support 242 extending to the metal structure 280, and the third electrode is not electrically connected to the metal structure 280 (not shown). Therefore, the protective device is electrically connected to an outer printed circuit board at least through the first electrode 220, the second electrode 230, the third electrode 240 and the fourth electrode 250. In other words, the heater 260 and the metal structure 280 are electrically independent of each other, and therefore, when the OVP occurs, the heating current flowed through the heater 260 only flows through the third electrode 240 and the fourth electrode 250, but does not flow through the metal structure 280 via the intermediate support 242.

Referring to FIGS. 10A to 10D, a protective device 200*a* according to another embodiment of the present invention is provided. The protective device 200*a* of the present embodiment is similar to the protective device 200 of FIGS. 9A to 9D, and the difference between the both lies in that the heater 260, the second extending portion 244, the third extending portion 252, and the insulating layer 290 of the protective device 200*a* are all disposed on the first surface 51 of the substrate 210. Further, a solder layer D as an intermediate layer may be formed, for example, by coating on the first electrode 220, the second electrode 230, and the intermediate support 242 of the third electrode 240. A material of the solder layer D includes tin-lead alloy, tin-silver alloy, gold, silver, tin, lead, bismuth, indium, gallium, palladium, nickel, copper, alloy thereof, and other metallic material, and the solder layer D can further includes 10-15% of the auxiliary medium to reduce the surface tension between the melted solder layer D and the metal structure 280 and help expand the metal structure 280 to ensure the blow result.

Figure 10A:
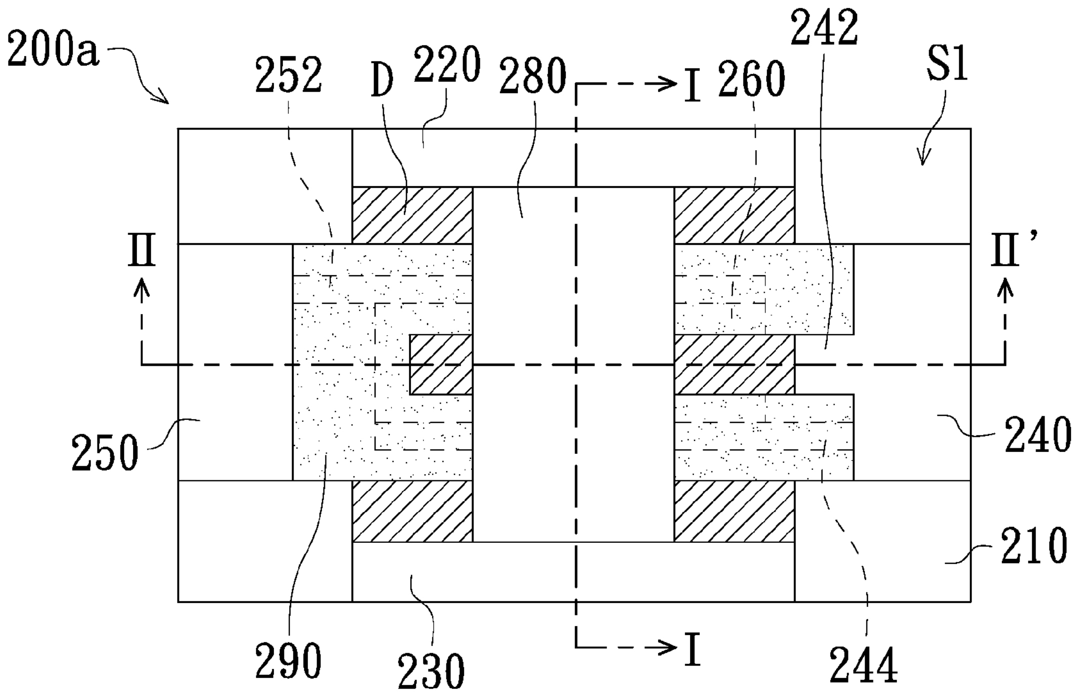
FIG. 10A is a top view of the protective device according to one embodiment of the present invention.
Figure 10B:
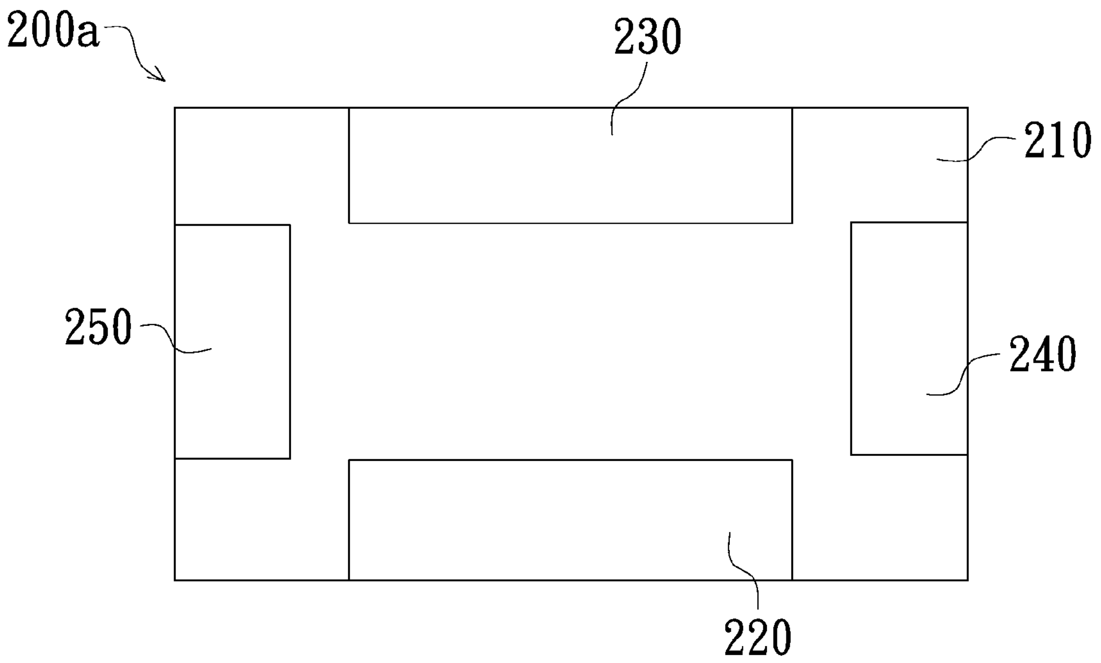
FIG. 10B is a bottom view of the protective device shown in FIG. 10A.
Figure 10C:
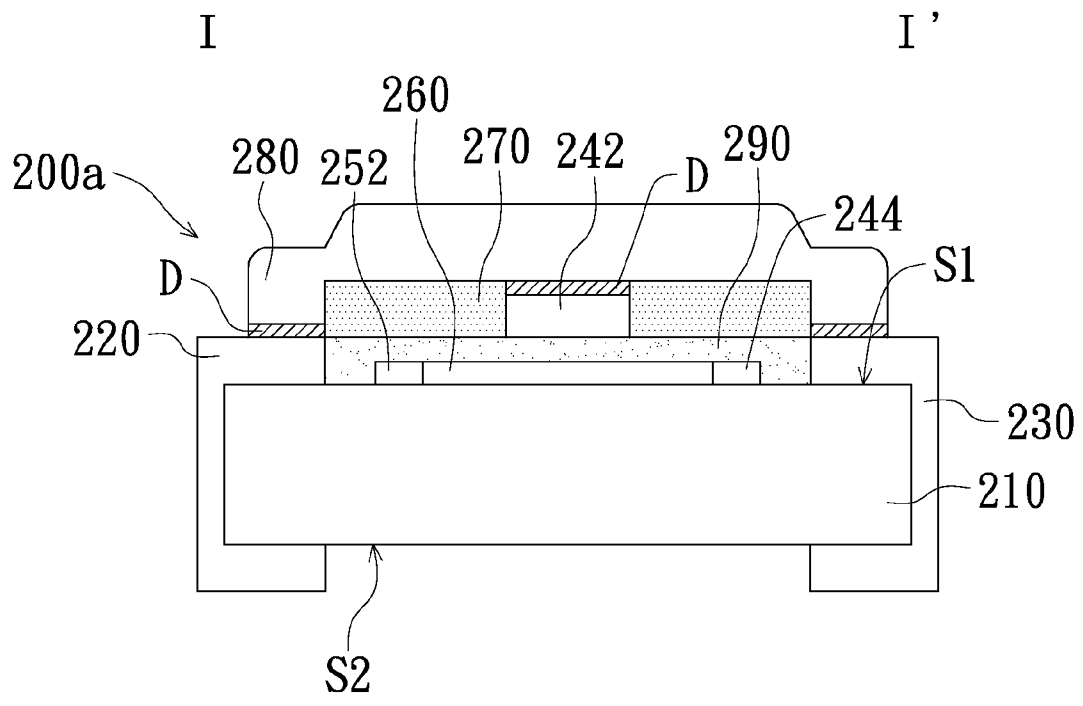
FIG. 10C is a cross-sectional view illustrating the protective device along a sectional line I-I' in FIG. 10A.
Figure 10D:
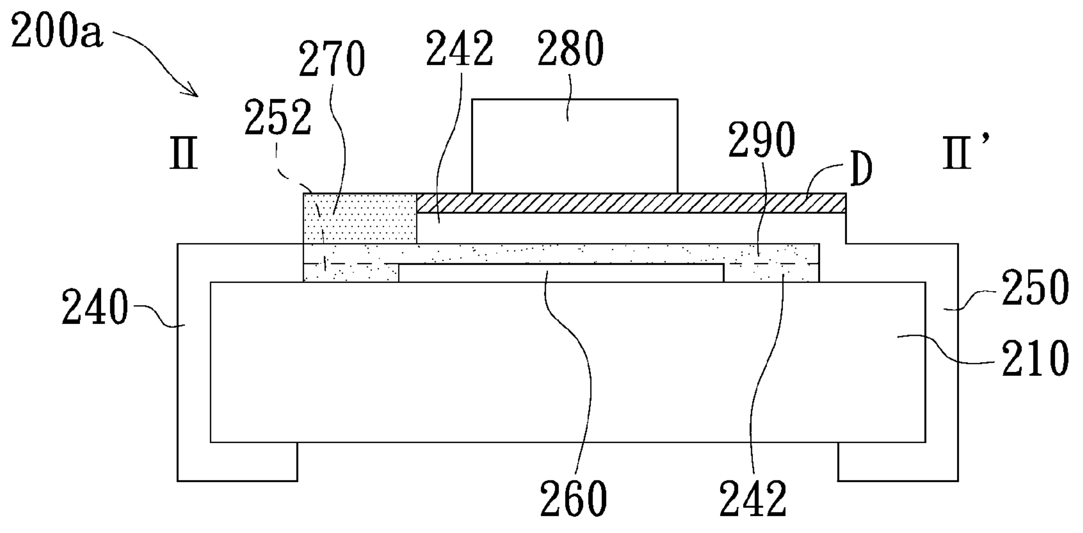
FIG. 10D is a cross-sectional view illustrating the protective device along a sectional line II-II in FIG. 10A.

In detail, the second extending portion 244 and the third extending portion 252 are disposed on the first surface S1 and between the first electrode 220 and the second electrode 230. The heater 260 is electrically connected to the second extending portion 244 and the third extending portion 252, and the insulating layer 290 covers the heater 260, the second extending portion 244 and the third extending portion 252. The intermediate support 242 of the third electrode 240 extends to a location overlapping the insulating layer 290. The arc extinguishing structure 270 is disposed on the insulating layer 290 and around the intermediate support 242. The metal structure 280 is across the first electrode 220 and the second electrode 230, and covers the arc extinguishing structure 270 and the intermediate support 242, so that the arc extinguishing structure 270 is disposed between the metal structure 280 and the insulating layer 290. Therefore, when the heater 260 generates heat, heat is conducted to the metal structure 280 through the arc extinguishing structure 270 and the insulating layer 290, so as to melt the metal structure 280. At this point, the arc extinguishing structure 270 directly contacting the metal structure 280 helps melt the metal structure 280 to extinguish the arc within the shorter time. According to the present embodiment, the intermediate support 242 and the second extending portion 244 are respectively disposed on two planes (as shown by FIGS. 10C and 10D) which are substantially parallel but do not overlap with each other.

Figure 11A:
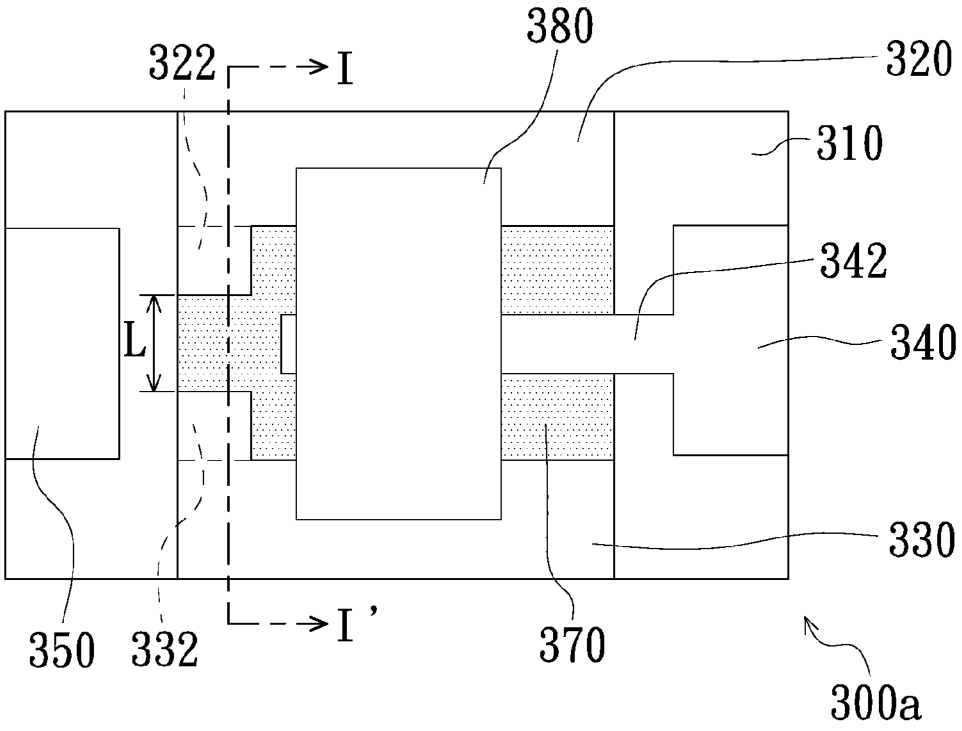
FIG. 11A is a schematic top view of a protective device according to an embodiment of the invention.
Figure 11B:
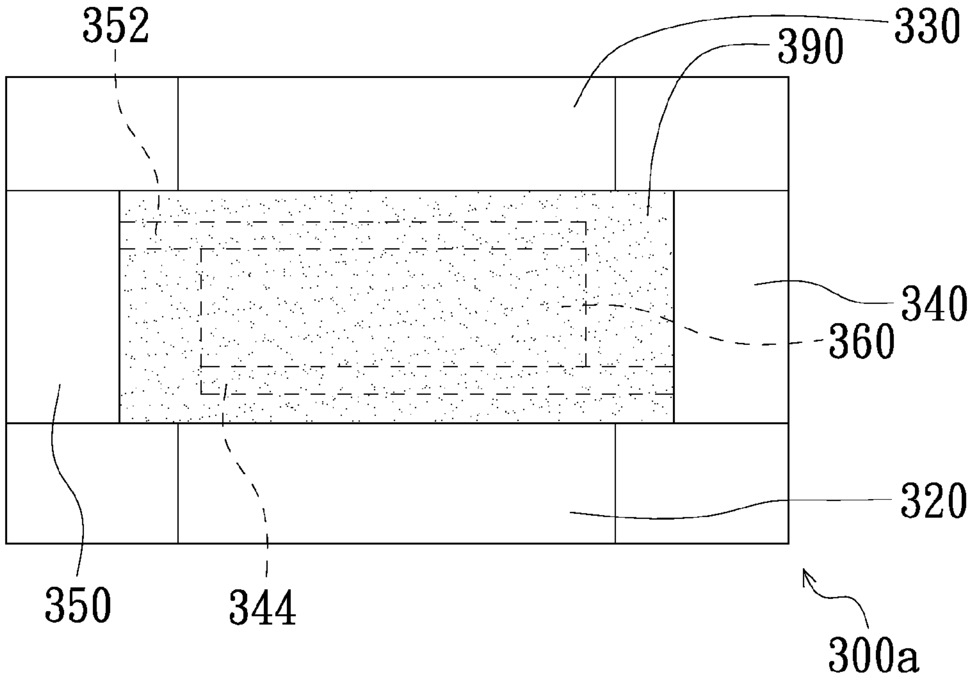
FIG. 11B is a bottom view of the protective device in FIG. 11A.
Figure 11C:
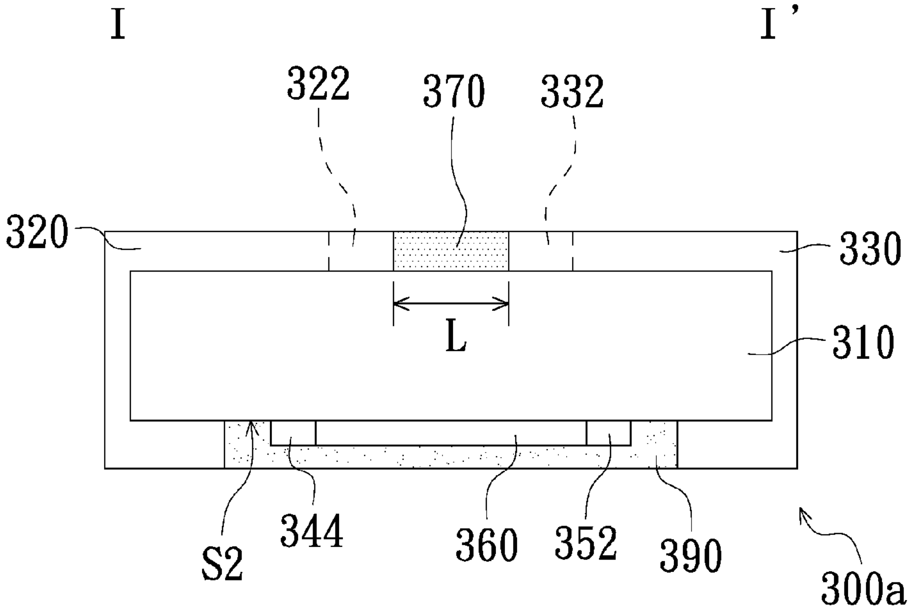
FIG. 11C is a schematic cross-sectional view taken along a line I-I' in FIG. 11A.

FIGS. 11A to 11C show another embodiment of a protective device 300*a* according to the present invention. The protective device 300*a* in FIGS. 11A to 11C is similar to the protective device 200 in FIGS. 9A to 9D, wherein the main difference is that the first electrode 320 of the protective device 300*a* in FIGS. 11A to 11C has a first protrusion 322, and the second electrode 330 has a second protrusion 332.

In more detail, both the first protrusion 322 and the second protrusion 332 are disposed between the intermediate support 342 and the fourth electrode 350, and extended to the intermediate support 342 and/or metal structure 380. A distance L is present between the first protrusion 322 and the second protrusion 332. According to the present embodiment, the distance L is preferably from 0.1 mm to 0.4 mm, so that short-circuiting between the first electrode 320 and the second electrode 330 is avoided.

Since according to the present embodiment, the first electrode 320 and the second electrode 330 respectively have the first protrusion 322 and the second protrusion 332, the melted metal structure 380 is affected by surface tension to flow towards the first protrusion 322 and the second protrusion 332. In other words, the first protrusion 322 and the second protrusion 332 increase the flowing space and adhesive area of the melted metal structure 380. Therefore, the melted metal structure 380 does not accumulate or remain between the first electrode 320 and the intermediate support 342 or between the second electrode 330 and the intermediate support 342, thereby preventing short-circuiting.

In addition, here it should be noted that the forms of the first electrode 320 and the second electrode 330 are not limited in the invention. Although as mentioned here the first electrode 320 and the second electrode 320, as embodied, respectively have the first protrusion 322 and the second protrusion 332, the first electrode 320 and the second electrode 330 may have only one protrusion or a plurality of protrusions having different sizes according to other embodiments which are not shown. Said embodiments also belong to technical plans adoptable by the invention, and are therefore within the scope of the invention.

Figure 12A:
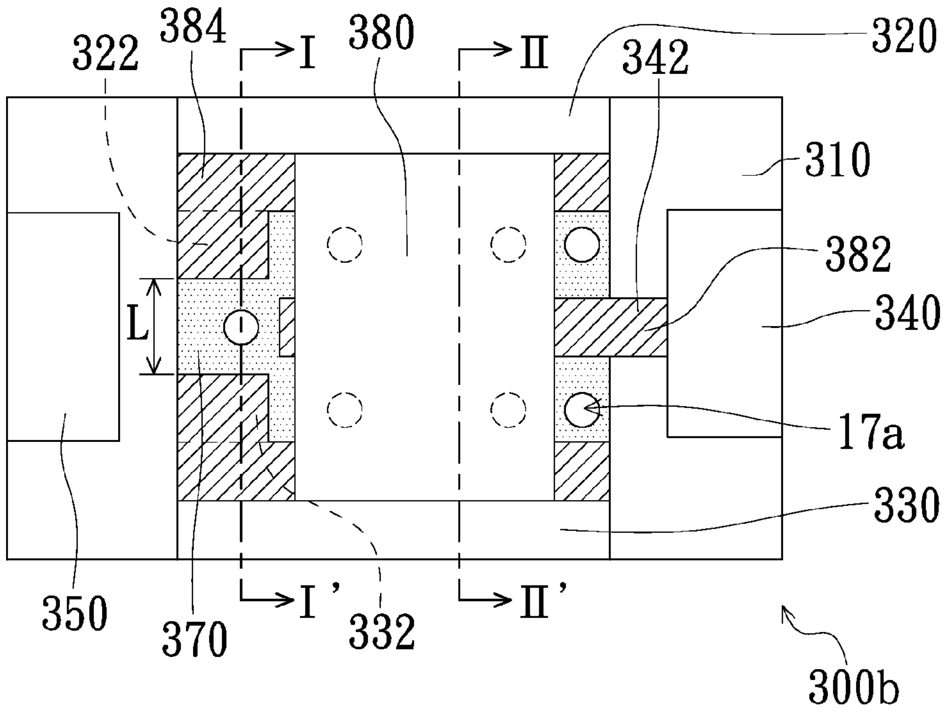
FIG. 12A is a schematic top view of a protective device according to another embodiment of the invention.
Figure 12B:
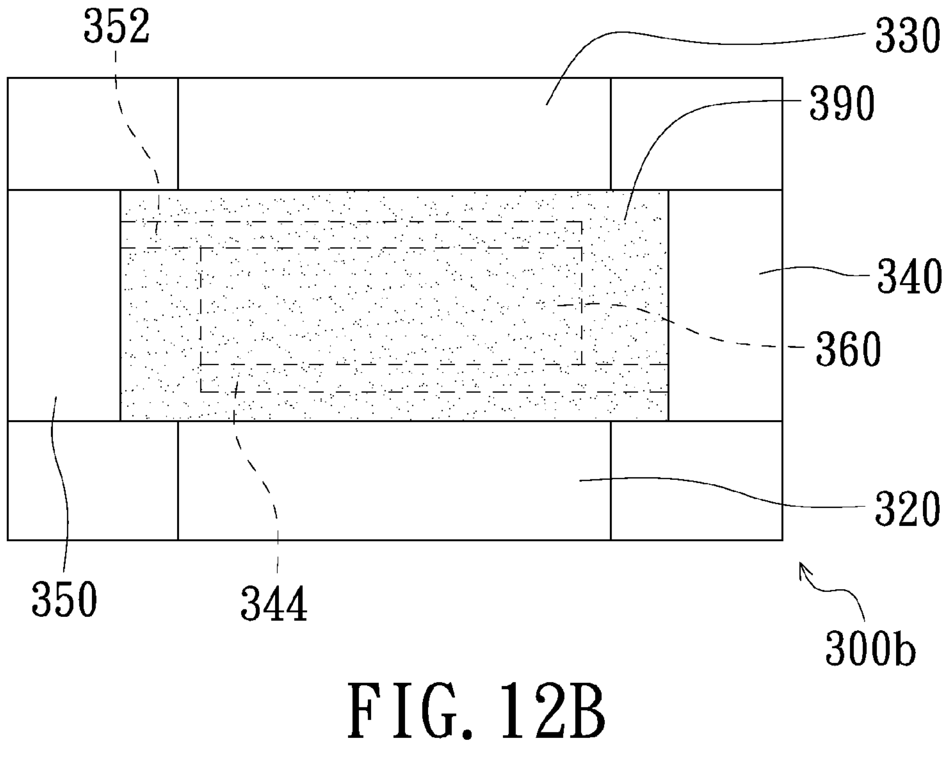
FIG. 12B is a bottom view of the protective device in FIG. 12A.
Figure 12C:
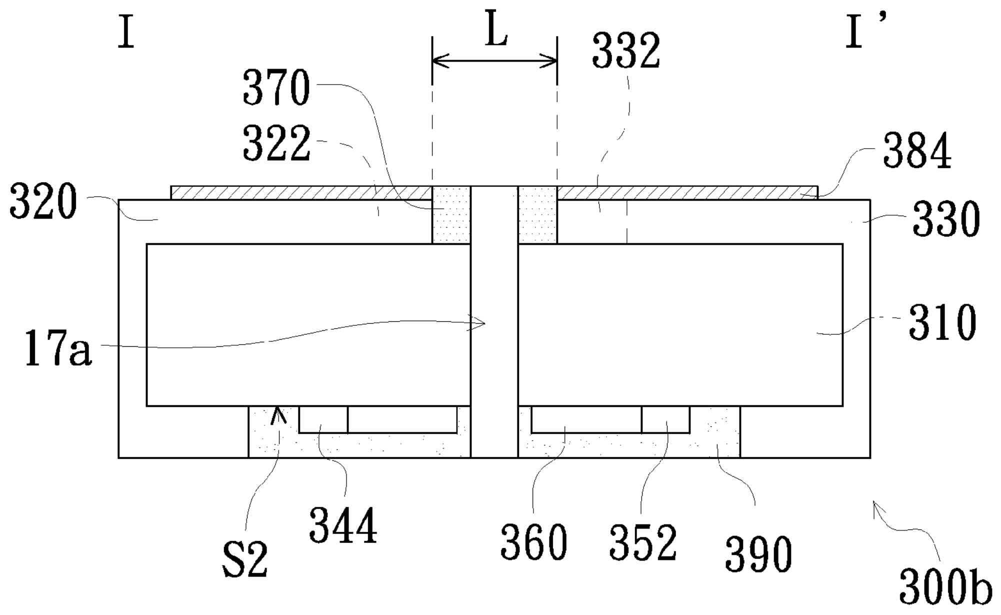
FIG. 12C is a schematic cross-sectional view taken along a line I-I' in FIG. 12A.
Figure 12D:
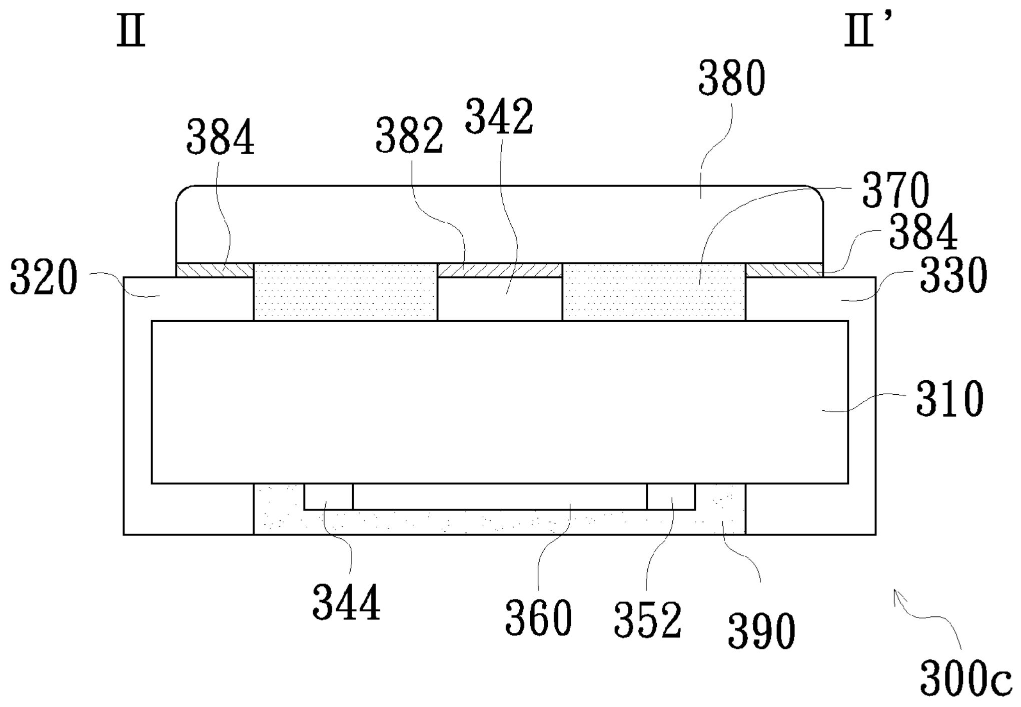
FIG. 12D is a schematic cross-sectional view taken along a line in FIG. 12A.

FIG. 12A is a schematic top view of a protective device according to another embodiment of the invention. FIG. 12B is a bottom view of the protective device in FIG. 12A. FIG. 12C is a schematic cross-sectional view taken along a line I-I' in FIG. 12A. FIG. 12D is a schematic cross-sectional view taken along a line II-II' in FIG. 12A. According to the present embodiment, a protective device 300*b* in FIGS. 12A to 12D is similar to the protective device 300*a* in FIGS. 11A to 11C, wherein the main difference is that the protective device 300*b* in FIGS. 12A to 12D further includes at least one hole 17*a* disposed in a portion of the substrate 210, an intermediate layer on the first electrode 320, the second electrode 330, and the intermediate support 342, and the intermediate layer having a fusing temperature lower than that of the metal structure 380. The hole 17*a* may be a through hole passing through the arc extinguishing structure 370, the substrate 310, the heater 360 and the insulation layer 390. The insulation layer 390 may be extended to cover the inner wall of the heater 360 surrounding the hole 17*a*.

In detail, the intermediate layer may include a first intermediate layer 382 disposed between the metal structure 380 and the intermediate support 342, and a second intermediate layer 384 disposed between the first electrode 320 and the second electrode 330. Therefore, when the heater 360 generates heat so that the flux included in the arc extinguishing structure 370, the metal structure 380, and the intermediate layer are all in a melted state, the melted metal structure 380 has a wetting effect due to the intermediate layer and the flux included in the arc extinguishing structure 370 in the melted state and flows towards the first protrusion 322 and the second protrusion 332 as being affected by surface tension. In other words, the intermediate layer and the flux included in the arc extinguishing structure 370 in the melted state prevents the melted metal structure 380 from accumulating or remaining between the first electrode 320 and the intermediate support 342 or between the second electrode 330 and the intermediate support 342, thereby preventing short-circuiting. Reliability of the protective device 300*b* is thereby further enhanced.

In addition, the intermediate layer may be solder materials, for example, a tin/silver alloy (96.5% tin and 3.5% silver), or a metal such as gold, silver, tin, lead, bismuth, indium, gallium, palladium, nickel, or copper, and the solder material may further include a flux during the solder material is welded, and after the welding process, the solder material does not include the flux. In this embodiment, the first intermediate layer 382 and the second intermediate layer 384 respectively include a first solder material having a first fusing temperature and a second solder material having a second fusing temperature.

In particular, according to the present embodiment, the melting temperature of the metal structure 380 is higher than the fusing temperature of the second intermediate layer 384, and the fusing temperature of the second intermediate layer 384 is higher than a temperature (an assembly temperature, for example, reflow temperature is equal to 260° C.) at which the protective device 300*c* is assembled on a circuit board (not shown). Moreover, the melting temperature of the metal structure 380 (for example, 300° C.) is higher than the fusing temperature of the second intermediate layer 384, and the fusing temperature of the second intermediate layer 384 is higher than the fusing temperature of the first intermediate layer 382.

According to the present embodiment, the fusing temperature of the first intermediate layer 382 is lower than the fusing temperature of the second intermediate layer 384. Hence, when the heater 360 generates heat, the first intermediate layer 382 fuses with the metal structure 380 thereon, so that the melting temperature of the metal structure 380 is lowered, thereby reducing the time for fusing the metal structure 380. In detail, when the fusing temperature of the first intermediate layer 382 is lower than the temperature at which the protective device 300*c* is assembled on the circuit board (not shown), during assembly of the first intermediate layer 382 on the protective device 300*c*, the first intermediate layer 382 first fuses with the metal structure 380 thereon, so that the melting temperature of the metal structure 380 is lowered, thereby reducing the time for fusing the metal structure 380. In addition, the second intermediate layer 384 having a higher fusing temperature is formed on the first electrode 320 and the second electrode 330, so that when assembling the protective device 300*c* on the circuit board (not shown), shifting of the metal structure 380 caused by melting of the second intermediate layer 384 is prevented, and resistance is not affected after assembly.

Figure 13A:
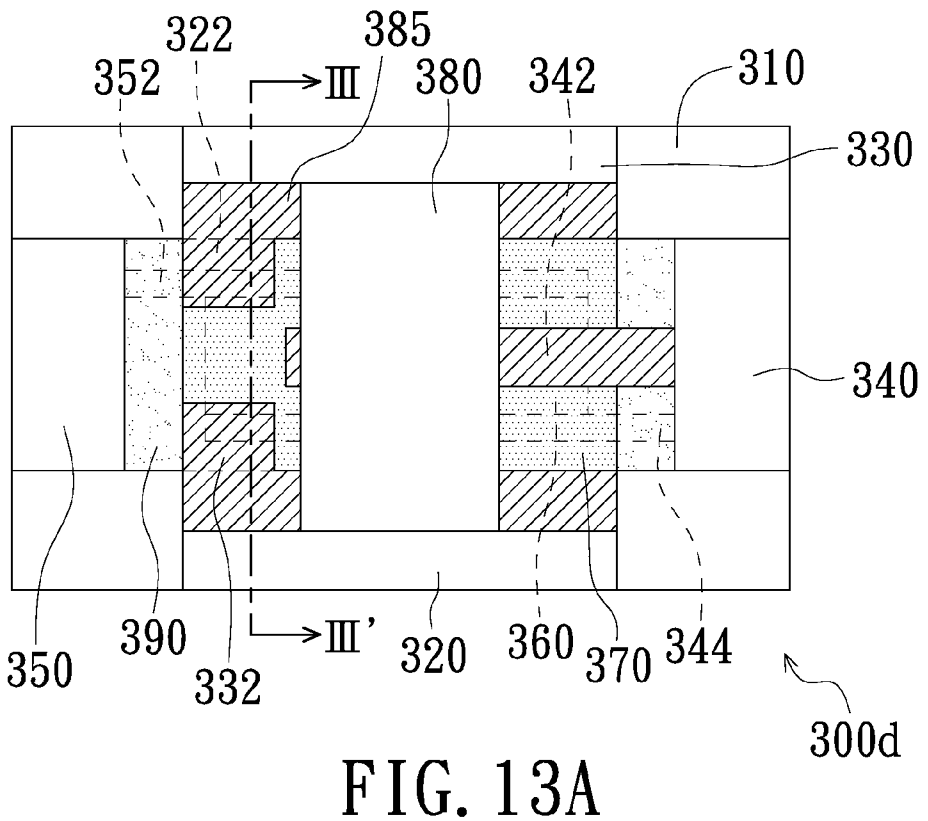
FIG. 13A is a schematic top view of a protective device according to another embodiment of the invention.
Figure 13B:
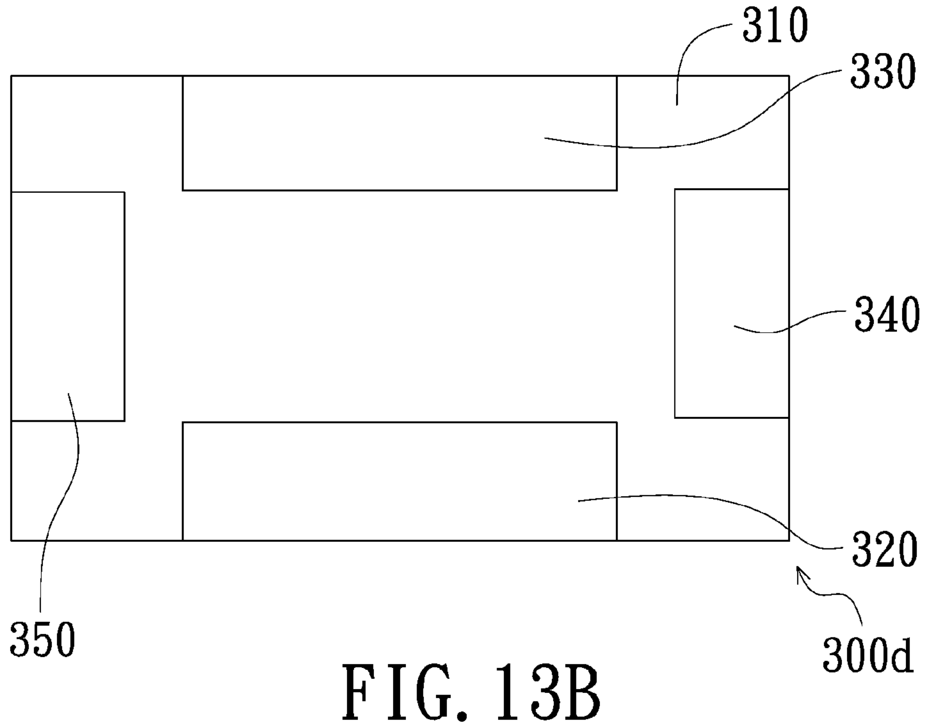
FIG. 13B is a bottom view of the protective device in FIG. 13A.
Figure 13C:
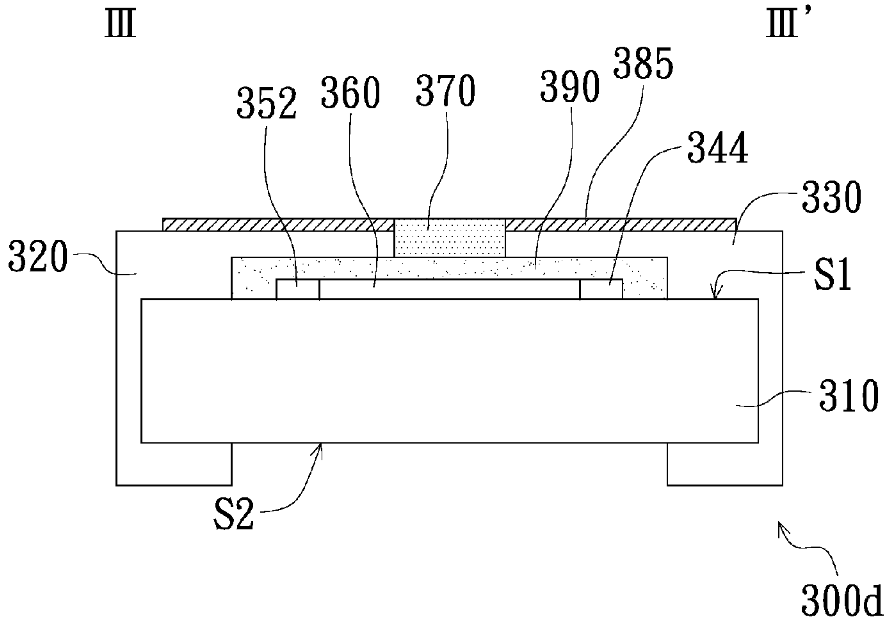
FIG. 13C is a schematic cross-sectional view taken along a line in FIG. 13A.

Please refer to all FIGS. 13A, 13B, and 13C. According to another embodiment of the invention, a protective device 300*d* in FIGS. 13A to 13C is similar to the protective device 300*a* in FIGS. 11A to 11C, wherein the main difference is that in the protective device 300*d* in FIGS. 13A to 13C, the heater 360, the second extending portion 344, and the third extending portion 352 are all disposed on the first surface S1 of the substrate 310.

To be more specific, in the present embodiment, the second extending portion 344 and the third extending portion 352 are disposed between the first electrode 320 and the second electrode 330, and the heater 360 is disposed on the first surface S1 of the substrate 310 and connects the second extending portion 344 and the third extending portion 352. The insulation layer 390 is disposed between the intermediate support 342 and the second extending portion 344 and the third extending portion 352, meaning that the intermediate support 342 is disposed on a surface of the insulation layer 390, and the second extending portion 344 and the third extending portion 352 are disposed on another opposite surface of the insulation layer 390. In particular, orthographic projections of the intermediate support 342, the second extending portion 344, and the third extending portion 352 on the insulation layer 390 do not overlap.

Moreover, the arc extinguishing structure 370 is disposed on the insulation layer 390, between the intermediate support 342 and the first electrode 320 and between the intermediate support 342 and the second electrode 330. The metal structure 380 covers a part of the first electrode 320, the arc extinguishing structure 370, the intermediate support 342, and the second electrode 330, so that the arc extinguishing structure 370 is disposed between the metal structure 380 and the insulation layer 390. Hence, when the heater 360 generates heat, heat is conducted to the arc extinguishing structure 370 and the metal structure 380 through the insulation layer 390, so that the metal structure 380 is melted. In the meantime, the arc extinguishing structure 370 composed of the flux which directly contacts the metal structure 380 also facilitates melting of the metal structure 380, and the arc extinguishing structure composed of the inorganic particles or made of polysiloxanes, the arc extinguishing effect is improved to induce less number of conductive objects, and moreover the conductive objects accumulated in the gap are isolated to prevent a broken circuit from being electrically conducted by the conductive objects.

Figure 14A:
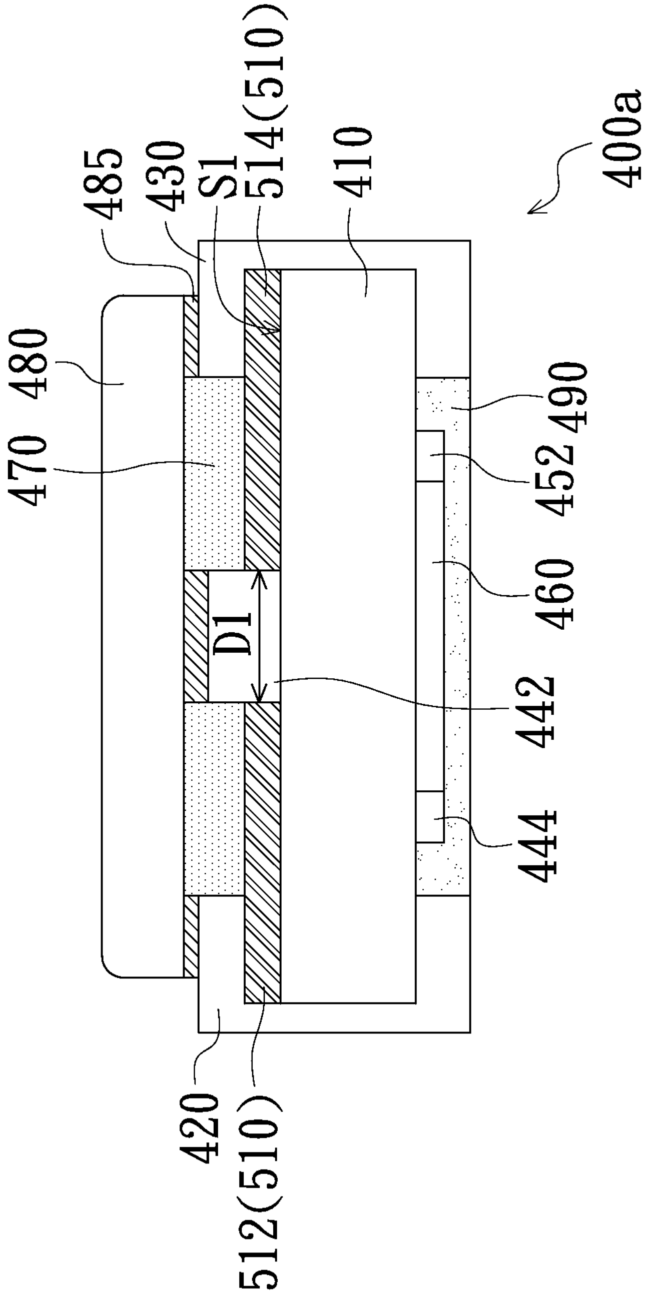
FIG. 14A is a schematic cross-sectional view of a protective device according to another embodiment of the invention.
Figure 14B:
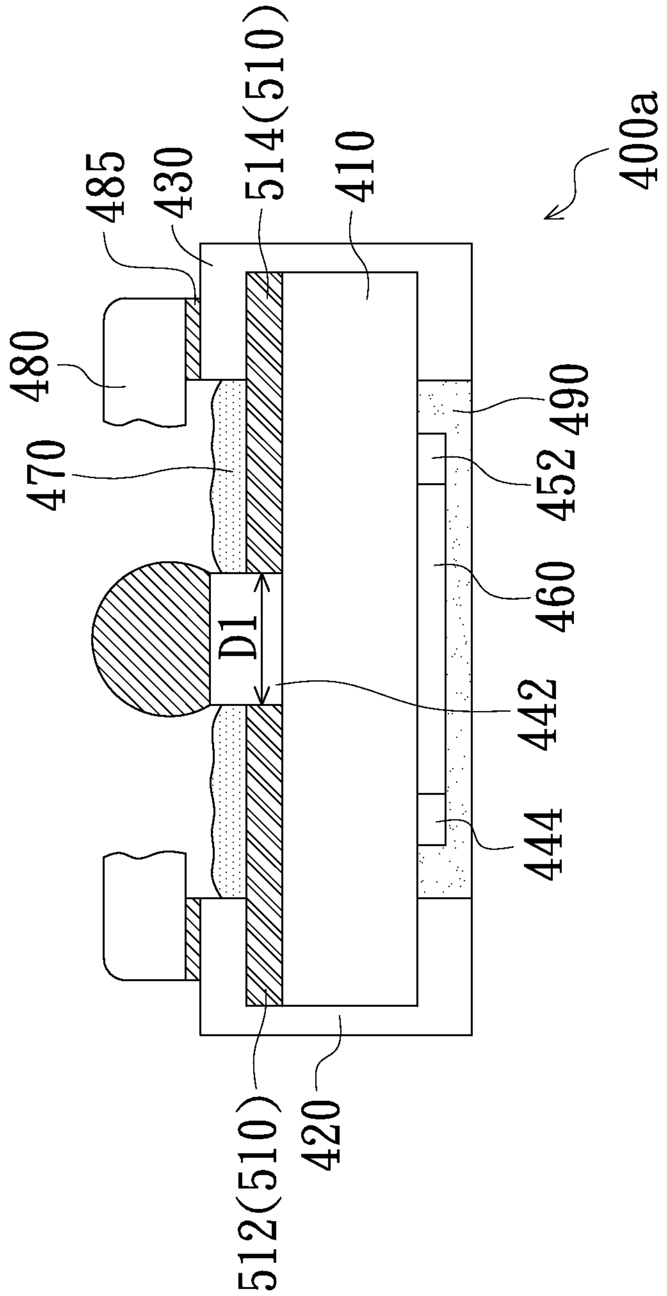
FIG. 14B is a schematic cross-sectional view of the protective device in FIG. 14A after breaking.

FIG. 14A is a schematic cross-sectional view of a protective device according to another embodiment of the invention. FIG. 14B is a schematic cross-sectional view of the protective device in FIG. 14A after breaking. According to the present embodiment, a protective device 400*a* in FIG. 14A is similar to the protective device 200 in FIGS. 9A to 9D, wherein the main difference is that the protective device 400*a* in FIG. 14A has a first insulating layer 510.

In more detail, the first insulating layer 510 of the protective device 400*a* is disposed on the first surface 51 of the substrate 410, and has a first low thermal conductive portion 512 and a second low thermal conductive portion 514 unconnected to the first low thermal conductive portion 512. Herein, the first low thermal conductive portion 512 is located between the heater 460 and the first electrode 420, the second low thermal conductive portion 514 is located between the heater 460 and the second electrode 430, and the arc extinguishing structure 470 covers at least a portion of the first insulating layer 510. Specifically, the first low thermal conductive portion 512 is located between the substrate 410 and the first electrode 420, and the second low thermal conductive portion 514 is located between the substrate 410 and the second electrode 430. A first space D1 exists between the first low thermal conductive portion 512 and the second low thermal conductive portion 514, and the intermediate support 442 is disposed in the first space D1. In addition, a material of the first insulating layer 510 includes a glass material or a polymer material, for example. A thermal conductivity coefficient of the first insulating layer 510 is smaller than that of the substrate 410, preferably, a thermal conductivity coefficient of the first insulating layer 510 is smaller than 2 W/(mK). For instance, the glass material can includes PbO, $SiO_2$, $Na_2O_3$, $B_2O_3$, MgO, CaO, etc. A thermal conductivity coefficient of the glass material is between 1 W/(mK) and 1.5 W/(mK). The polymer material can be a polyurethane (PU), polyimide, epoxy or UV curing resin, for example. A thermal conductivity coefficient of the polymer material is between 0.19 W/(mK) and 0.6 W/(mK).

Particularly, the thermal conductivity coefficient of the substrate 410 is greater than that of the first insulating layer 510. That is, relative to the first insulating layer 510, the substrate 410 is referred as a high thermal conductive layer, so that the heat generated by the heater 460 can directly pass through the central portion of the substrate 410 and be quickly transferred to the intermediate support 442. Certainly, the substrate 410 and the first insulating layer 510 can be made of the same material, namely, the substrate 410 can be referred as a low thermal conductive layer. However, a sum of a thickness of the substrate 410 and a thickness of the first insulating layer 510 is substantially greater than the thickness of the substrate 410. Therefore, the heat generated by the heater 460 can be directly passed through the central portion of the substrate 410 and be quickly transferred to the intermediate support 442, and then the metal structure 480 located on the intermediate support 442 will be melted at first to protect the electric circuit from over voltage and/or current, as shown in FIG. 14B. In other word, the material of the substrate 410 can be selected according to practical requirements without influencing the efficacy of the present embodiment.

The protective device 400*a* in the present embodiment has the first insulting layer 510. Hence, when the heater 460 generates heat and transfers heat to the electrodes through the substrate 410, a portion of heat generated by the heater 460 will be obstructed by the first insulating layer 510 so as to reduce the heat which the first electrode 420 and the second electrode 430 are obtained, and the other portion of heat generated by the heater 460 will be directly transferred to the metal structure 480 via the third electrode 440 so as to blow the metal structure 480 located over the third electrode 440, namely, the metal structure 480 is partially melted and the melted region is smaller, thereby efficiently and intensively melting the overlapping region with the intermediate support 442 or the first space D1. Consequently, the adhesive area of the melted metal structure 480 can be controlled effectively to obtain the stable melt time and mode, the alignment error of the process between the heater 460 and the third electrode 440 can be reduced, and over voltage protection or an over current protection is achieved.

In other aspect, since the metal structure 480 is partially melted and the melted region is smaller, the driving time for protective device 400*a* in over voltage protection is reduced, and the short-circuiting caused by the melted metal structure 480 electrically connecting the intermediate support 442 and the first electrode 420 or the intermediate support 442 and the second electrode 430 is also reduced. Thereby, reliability of the protective device 400*a* is also enhanced. Moreover, since the intermediate support 442 is disposed in a first space D1 existing between the low thermal conductive portion 512 and the second low thermal conductive portion 514, the arc extinguishing structure 470 composed of the inorganic particles (or made of polysiloxanes) and the flux can be guide to the peripheral of the intermediate support 442. Therefore, the intermediate support 442 can has a better wetting effect to make sure the stable of the melt time for melting the metal structure 480, and the arc extinguishing effect is improved to induce less number of conductive objects, and moreover the conductive objects accumulated in the gap are isolated to prevent a broken circuit from being electrically conducted by the conductive objects.

Figure 15:
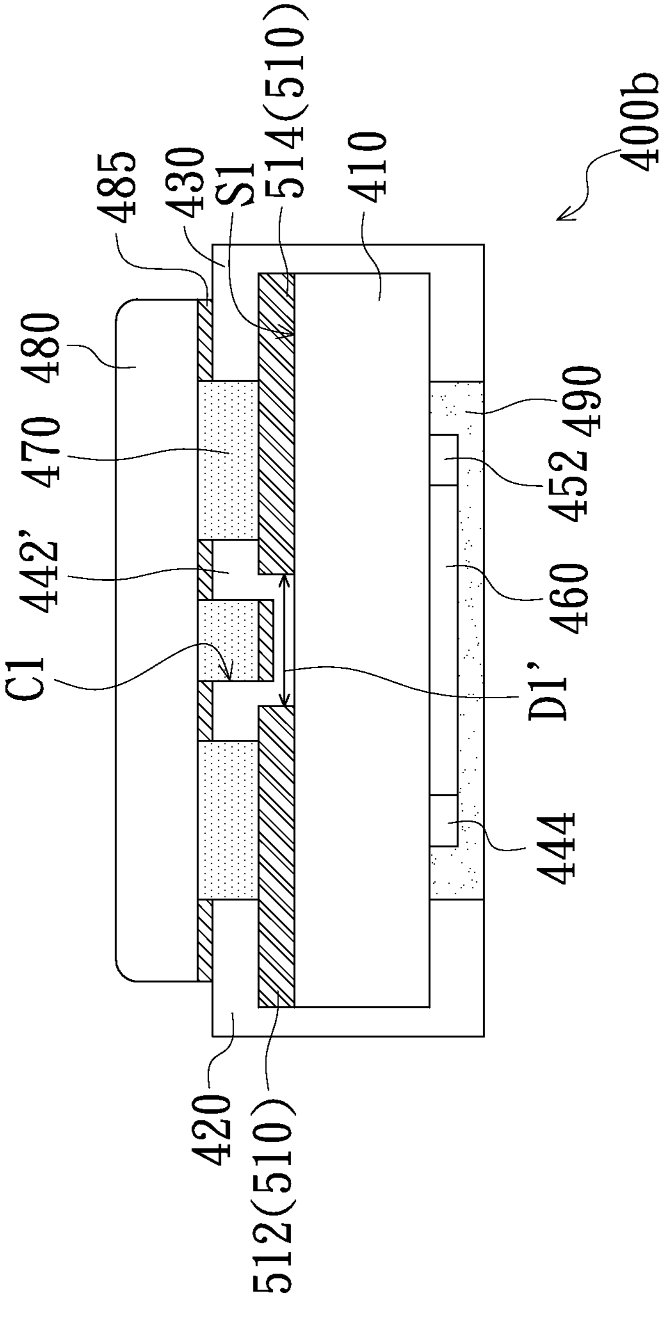
FIG. 15 is a schematic cross-sectional view of a protective device according to another embodiment of the invention.

FIG. 15 is a schematic cross-sectional view of a protective device according to another embodiment of the invention. According to the present embodiment, a protective device 400*b* in FIG. 15 is similar to the protective device 400*a* in FIG. 14A, wherein the main difference is that the intermediate support 442' of the protective device 400*b* in FIG. 15 has different design.

In more detail, a portion of the intermediate support 442' is located in the first space D1' and the other portion of the intermediate support 442' is located on the first low thermal conductive portion 512 and the second low thermal conductive portion 514. Specifically, in the present embodiment, since a distance of the first space D1' is greater than that of the first space D1, a notch structure C1 is produced in the intermediate support 442' due to the gravity during fabricating the electrode. Namely, the intermediate support 442' has the notch structure C1 located in the first space D1 and thereby producing a three-dimensional structure in the intermediate support 442' at the same space. Therefore, the adhesive area of the melted metal structure 480 can be increased. Moreover, the arc extinguishing structure 470 composed of the inorganic particles (or made of polysiloxanes) and the flux can also be added in the notch structure C1 so that the intermediate support 442' has a better absorption ability for adsorbing the melted metal structure 480.

Figure 16:
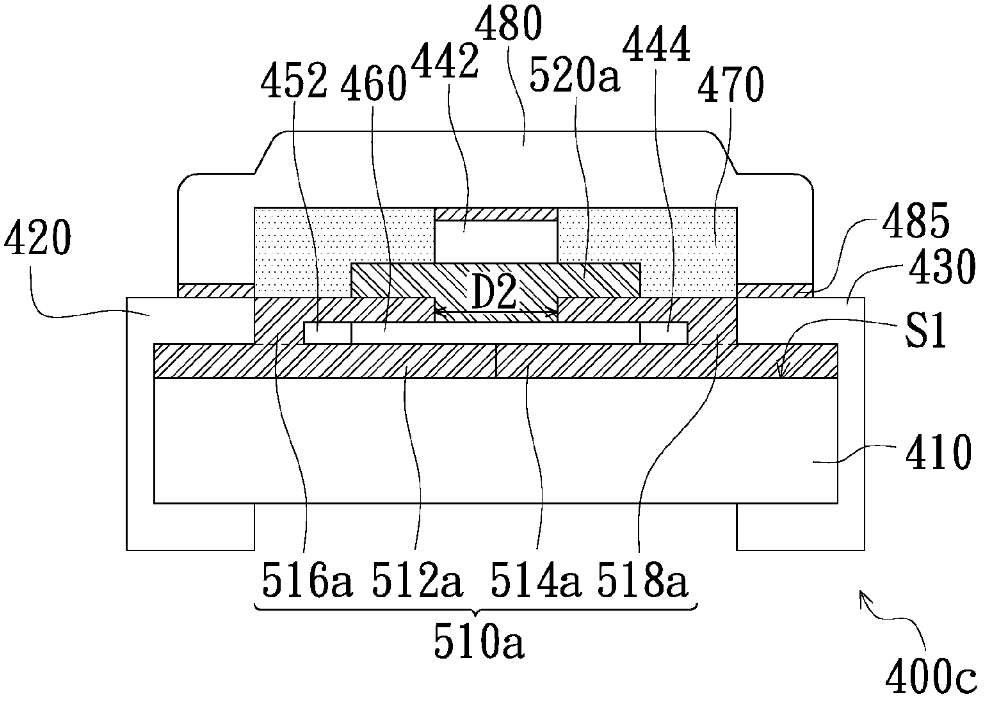
FIG. 16 is a schematic cross-sectional view of a protective device according to another embodiment of the invention.

FIG. 16 is a schematic cross-sectional view of a protective device according to another embodiment of the invention. According to the present embodiment, a protective device 400*c* in FIG. 16 is similar to the protective device 400*a* in FIG. 14A, wherein the main difference is that in the protective device 400*c* in FIG. 16, the heater 460, the second extending portion 444, and the third extending portion 452 are all disposed on the first surface S1 of the substrate 410, and the protective device 400*c* further includes a second insulating layer 520*a*. Herein, a thermal conductivity coefficient of the second insulating layer 520*a* is greater than that of the first insulating layer 510*a*.

To be more specific, in the present embodiment, the second extending portion 444 and the third extending portion 452 are disposed between the first electrode 420 and the second electrode 430, and the heater 460 is disposed on the first surface S1 of the substrate 410 and connects the second extending portion 444 and the third extending portion 452. In particular, orthographic projections of the intermediate support 442, the second extending portion 444, and the third extending portion 452 on the first surface S1 of the substrate 410 do not overlap.

Moreover, the second insulating 520*a* of the protective device 400*c* in the present embodiment is disposed between the heater 460 and the intermediate support 442 of the third electrode 430. Herein, the first low thermal conductive portion 512*a* connects the second low thermal conductive portion 514*a*, and the heater 460 is located between the second insulating layer 520*a* and the first insulating layer 510*a*. Specifically, the first insulating layer 510*a* in the present embodiment further includes a third low thermal conductive portion 516*a* and a fourth low thermal conductive portion 518*a*. The third low thermal conductive portion 516*a* connects the first low thermal conductive portion 512*a* and extends to the third extending portion 452, and the fourth low thermal conductive portion 518*a* connects the second low thermal conductive portion 514*a* and extends to the second extending portion 444. In the present embodiment, a second space D2 exists between the third low thermal conductive portion 516*a* and the fourth low thermal conductive portion 518*a*, and a portion of the second insulating layer 520*a* is located on the third low thermal conductive portion 516*a* and the fourth low thermal conductive portion 518*a*. In addition, in order to make a greater part of heat generated by the heater 460 transfer to the intermediate support 442, preferably, a thermal conductivity coefficient of the second insulating layer 520*a* is greater than a multiple of that of the first insulating layer 510*a*. For example, a material of the second insulating layer 520*a* can be a ceramic material, for example, $Al_2O_3$, BN, AlN. A thermal conductivity coefficient of $Al_2O_3$ is between 28 W/(mK) and 40 W/(mK); a thermal conductivity coefficient of BN is between 50 W/(mK) and 60 W/(mK); a thermal conductivity coefficient of AlN is between 160 W/(mK) and 230 W/(mK). Preferably, a thermal conductivity coefficient of the second insulting layer 520*a* is between 8 W/(mK) and 80 W/(mK).

The second insulating layer 520*a* of the protective device 400*c* is located between the intermediate support 442 and the heater 460. Hence, when the overvoltage occurs, a major portion of thermal energy produced by the heating current flowing to the heater may efficiently transmits to the metal structure 480 through the intermediate support 442, and thus, the metal structure 480 is partially melted and the melted region is smaller, thereby efficiently and intensively melting the overlapping region with the intermediate support 442 or the second space D2.

Figure 17:
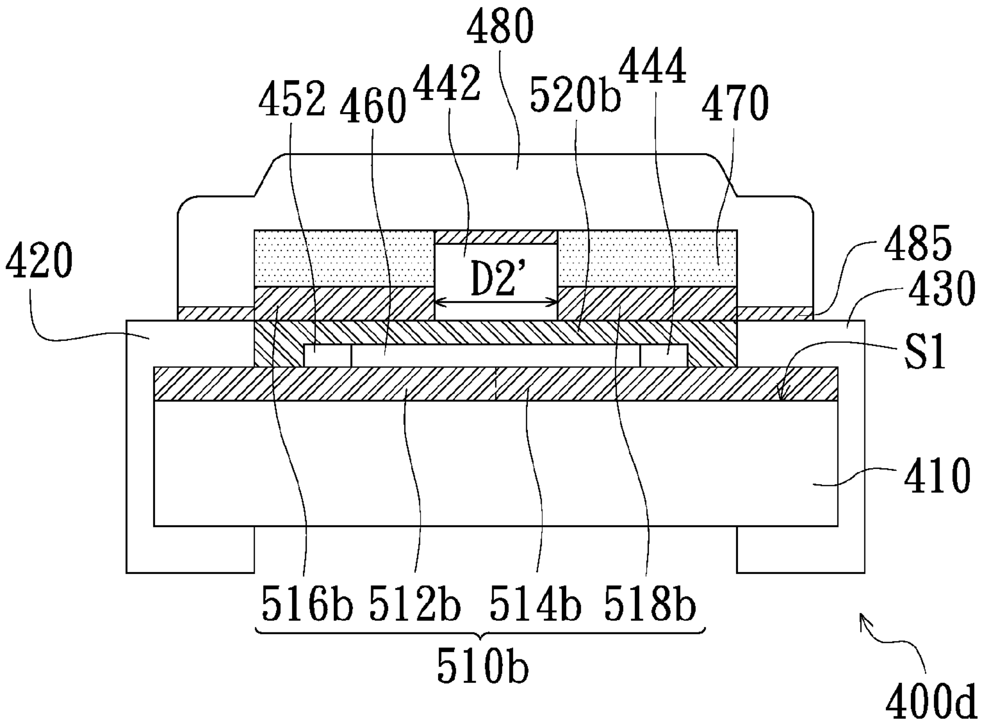
FIG. 17 is a schematic cross-sectional view of a protective device according to another embodiment of the invention.

FIG. 17 is a schematic cross-sectional view of a protective device according to another embodiment of the invention. According to the present embodiment, a protective device 400*d* in FIG. 17 is similar to the protective device 400*c* in FIG. 16 except that the first insulating layer 510*b* and the second insulting layer 520*b* of the protective device 400*d* in FIG. 17 have a different disposing position.

In more detail, the third low thermal conductive portion 516*b* and the fourth low thermal conductive portion 518*b* are disposed on the second insulating layer 520*b*, a second space D2' exists the third low thermal conductive portion 516*b* and the fourth low thermal conductive portion 518*b*, and the intermediate support 442 is disposed in the second space D2'. The protective device 400*d* of the present embodiment has the first insulating layer 510*b* and the second insulating layer 520*b* simultaneously. Hence, when the heater 460 generates heat, a portion of heat generated by the heater 460 will be obstructed by the third low thermal conductive portion 516*b* and the fourth low thermal conductive portion 518*b*, thereby heat transferred to the metal structure 480 located over the third low thermal conductive portion 516*b* and the fourth low thermal conductive portion 518*b* can be reduced. In other aspect, the other portion of heat generated by the heater 460 will be directly transferred to the metal structure 480 via the second insulating layer 520*b* and the intermediate support 442 so as to blow the metal structure 480 located over the intermediate support 442. Consequently, the melt value of metal structure 480 can be reduced so as to reducing the driving time for protective device 400*d* in over voltage protection, and over voltage protection or an over current protection can be achieved at the same time.

Figure 18:
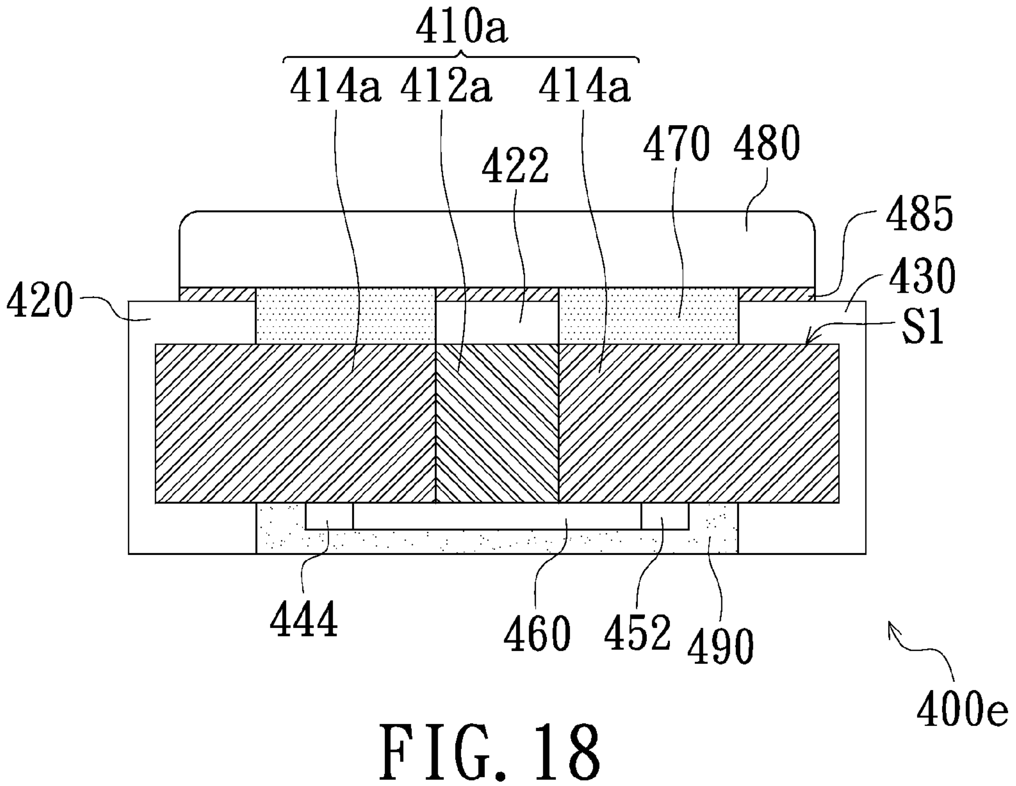
FIG. 18 is a schematic cross-sectional view of a protective device according to another embodiment of the invention.

FIG. 18 is a schematic cross-sectional view of a protective device according to another embodiment of the invention. According to the present embodiment, a protective device 400*e* in FIG. 18 is similar to the protective device 400*a* in FIG. 14A except that the substrate 410*a* of the protective device 400*e* in FIG. 18 is different from the substrate 410 of the protective device 400*a* in FIG. 14A.

In more detail, the substrate 410*a* has a first insulating block 412*a* and a second insulating block 414*a* connected to the first insulating block 412*a*. Herein, the second insulating block 414*a* surrounds the first insulating block 412*a*, and the first insulating block 412*a* and the second insulating block 414*a* are substantially co-planar. The intermediate support 442 is located on the first insulating block 412*a*, and the first electrode 420 and the second electrode 430 are located on the second insulating block 414*a*. The arc extinguishing structure 470 is disposed on the first surface S1 of the substrate 410*a* and located between the intermediate support 442 and the first electrode 420 and between the intermediate support 442 and the second electrode 430. Herein, the arc extinguishing structure 470 covers a portion of the second insulating block 414*a*. Particularly, a thermal conductivity coefficient of the first insulating bock 412*a* is greater than that of the second insulating block 414*a*.

Specifically, in the present embodiment, a material of the first insulating block 412*a*, for example, may be a ceramic material. The ceramic material may be $Al_2O_3$, BN, or AlN. Preferably, a thermal conductivity coefficient of the first insulating block 412*a* is between 8 W/(mK) and 40 W/(mK). In other aspect, a material of the second insulating block 414*a* is, for example, a glass material or a polymer material. For instance, the glass material can be $SiO_2$, $Na_2O_3$, $B_2O_3$, MgO, CaO, etc., and the polymer material can be a polyurethane (PU), polyimide, epoxy or UV curing resin. A thermal conductivity coefficient of the second insulating block 414*a* is smaller than 2 W/(mK).

The heater 460 is located on the first insulating bock 412*a*. Hence, when the heater 460 generates heat, a greater part of heat generated by the heater 460 will be directly transferred to the intermediate support 442 through the first insulating bock 412*a*, and the metal structure 480 located on the intermediate support 442 will be quickly blown so as to reduce the melt value of the metal structure 480, and over voltage protection is achieved.

Figure 19:
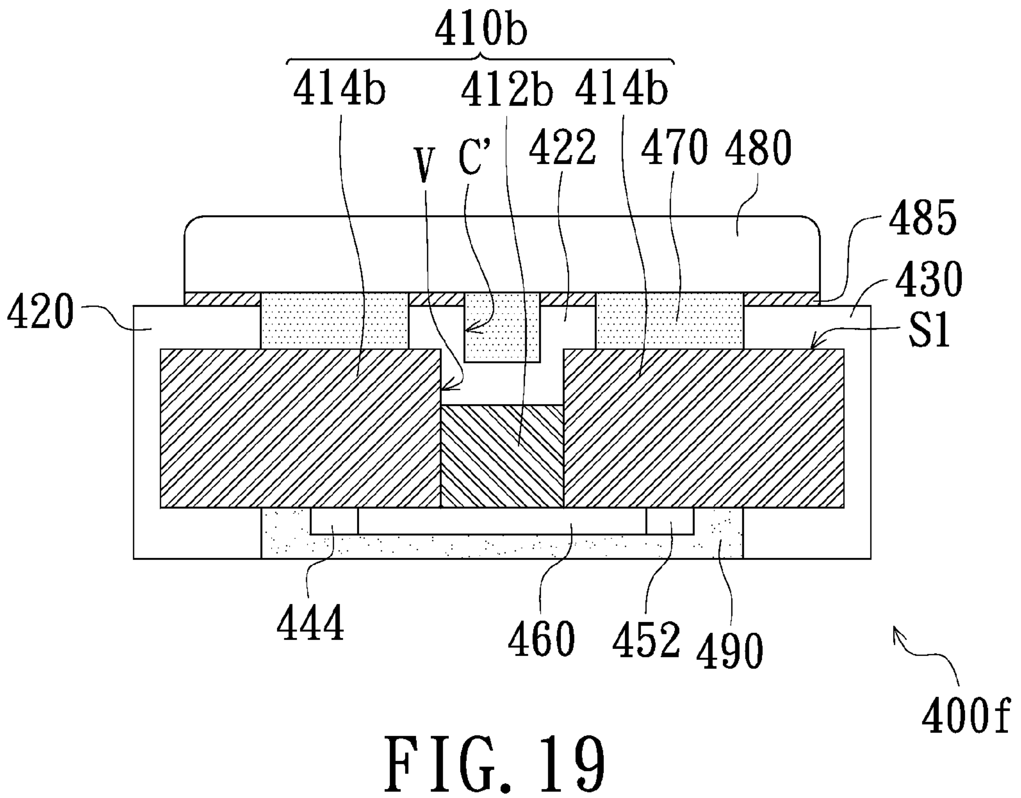
FIG. 19 is a schematic cross-sectional view of a protective device according to still another embodiment of the invention.

FIG. 19 is a schematic cross-sectional view of a protective device according to still another embodiment of the invention. According to the present embodiment, a protective device 400*f* in FIG. 19 is similar to the protective device 400*e* in FIG. 18 except that the first insulating block 412*b* and the second insulating block 414*b* of the substrate 410*b* of the protective device 400*f* in FIG. 19 are not co-planar substantially.

In more detail, a thickness of the first insulating block 412*b* is lower than a thickness of the second insulating block 414*b*, and the first insulating bock 412*b* is surrounded by the second insulating block 414*b* to form a notch V. A portion of the intermediate support 422 is disposed in the notch V and located on the first insulating block 412*b*, and the other portion of the intermediate support 422 is disposed on the second insulating block 414*b*. Specifically, in the present embodiment, since the notch V exists between the first insulating block 412*b* and the second insulating block 414*b*, during fabricating the electrode, a notch structure C' is produced in the intermediate support 442 due to the gravity. Therefore, a three-dimensional structure is produced in the intermediate support 442 at the same space, and the adhesive area of the melted metal structure 480 can be increased. Moreover, the arc extinguishing structure 470 composed of the inorganic particles (or made of polysiloxanes) and the flux can also be added in the notch structure C' so that the intermediate support 442 has better absorption ability for adsorbing the melted metal structure 480.

Figure 20:
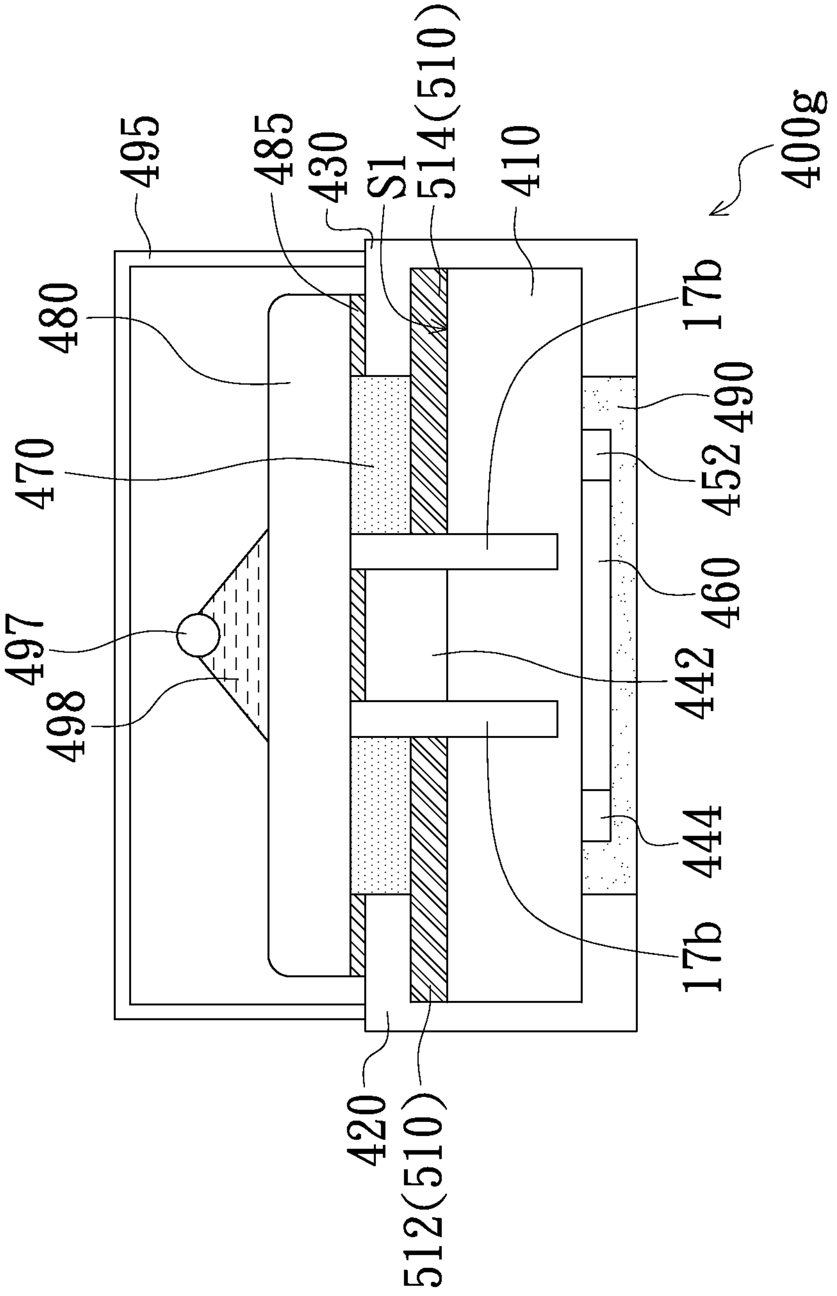
FIG. 20 is a schematic cross-sectional view of a protective device according to still another embodiment of the invention.

FIG. 20 is a schematic cross-sectional view of a protective device according to still another embodiment of the invention. According to the present embodiment, a protective device 400*g* in FIG. 20 is similar to the protective device 400*a* in FIG. 14A, wherein the main difference is that the protective device 400*g* in FIG. 20 includes an outer cover 495 and at least one hole 17*b* disposed in a portion of the substrate 410. In detail, the outer cover 495 is disposed on the first surface S1 of the substrate 410, covers the metal structure 480 to protect the metal structure 480, and prevents problems such as circuit interference caused by spilling of the melted metal structure 480, the auxiliary medium 470, and the solder layer 485. In addition, the material of the outer cover 495 includes, for example, alumina, polyetheretherketone (PEEK), nylon, thermal-curing resin, UV-curing resin, or phenol formaldehyde resin. The outer cover 495 can be applied to the above embodiments of FIGS. 9A to 19. The hole 17*b* is, for example, a blind hole passing through the auxiliary medium 470, the insulating layer 510 and having a bottom in the substrate 410.

Moreover, the protective device 400*g* further includes a metal wire 497, wherein an orthogonal projection of the metal wire 497 projected on the first surface S1 of the substrate 410 at least partially overlaps an orthogonal projection of the intermediate support 442 projected on the first surface S1 of the substrate 410.

More specifically, the metal wire 497 is disposed above the metal structure 480, and a portion of the metal wire 497 can be directly contacted with the metal structure 480. The metal wire 497 is fixed on the intermediate support 442 (or/and surface of the electrode, the protective device 400*g* or the outer cover 495) (not shown) and is, for example, a curve shape. A contacting portion 498 (composed of the inorganic particles (or made of polysiloxanes) and the flux) of the arc extinguishing structure may be disposed between the metal wire 497 and the metal structure 480 to serve as a medium to guide the flow of the melted metal structure 480, and the metal wire 497 is contacted with the metal structure 480 via the contacting portion 498 of the arc extinguishing structure. The contacting portion 498 of the arc extinguishing structure includes a plurality of inorganic particles and/or a flux, wherein material of the flux may be rosin, solder or a combination thereof. It should be noted that the outer surface of the metal wire 497 and the melted metal structure 480 should have better wetting and absorbability such as solderability, material of the metal wire 497 may include metal or alloy such as gold, silver, tin, copper, copper-silver alloy, or cooper-nickel-tin alloy etc. The material of the metal wire 497 also can composed of an outer metal layer having better solderability and an inner metal layer having better thermal conduction coefficient, for example, silver coated copper, nickel coated copper, tin coated copper, tin coated nickel, or gold coated copper, etc., wherein gold may be the outer metal layer.

Since the protective device 400*g* includes the metal wire 497, the melted metal structure 480 can be absorbed between the metal wire 497 and the intermediate support 442 due to surface tension and capillary phenomenon and further flow to the intermediate support 442, thereby cutting off the circuit to achieve over current protection and over voltage protection.

It should be noted that any one of the protective devices shown in FIGS. 3 to 7 and FIGS. 9A to 20 can be applied to the protective module of FIG. 8.

In summary, in an embodiment of the present invention, since the protective device includes the arc extinguishing structure composed of the inorganic particles or made of polysiloxanes, the arc extinguishing effect is improved, and conductive objects accumulated in the gap are isolated to prevent a broken metal structure from being electrically conducted by the conductive objects. Moreover, in an embodiment of the present invention, the arc extinguishing structure disposed on the inner surface of the outer cover also can prevent electrically conduction paths from being formed between the electrodes and improve the insulation impedance between the electrodes. Furthermore, in an embodiment of the present invention, the through hole or the blind hole disposed in the substrate can exhaust or receive the conductive objects such as carbon black and metal powder to prevent the conductive paths between the electrodes from being formed by the conductive objects, thereby improving the insulation impedance between the electrodes. The conductive objects (such as carbon black, metal powder and so on) produced in the breaking capacity test for the protective device can be exhausted via the through hole or received in the blind hole. It should be noted, the protective device can include both the hole (such as the through hole or the blind hole) and the arc extinguishing structure disposed in the gap.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A protective device, comprising:

a substrate;

an electrode layer disposed on the substrate, the electrode layer comprising at least one gap;

a metal structure disposed on the electrode layer and located above the gap, the metal structure having a melting temperature lower than a melting temperature of the electrode layer;

an outer cover disposed on the substrate and covering the metal structure and a portion of the electrode layer; and an arc extinguishing structure disposed between the outer cover and the substrate.

2. The protective device according to claim 1, wherein the arc extinguishing structure is disposed in the gap and located between the substrate and the metal structure.

3. The protective device according to claim 2, wherein the arc extinguishing structure comprises a plurality of inorganic particles.

4. The protective device according to claim 3, wherein diameters of the inorganic particles are smaller than 70 μm.

5. The protective device according to claim 2, wherein material of the arc extinguishing structure comprises polysiloxanes.

6. The protective device according to claim 2, wherein the arc extinguishing structure comprises a plurality of inorganic particles and a flux.

7. The protective device according to claim 6, wherein a sum of a weight of the inorganic particles and a weight of the flux is represented by A, and the weight of the inorganic particles is greater than $\frac{1}{20}$A.

8. The protective device according to claim 1, wherein the electrode layer has a side adjacent to the gap, and a length of the arc extinguishing structure is greater than a length of the side of the electrode layer.

9. The protective device according to claim 1 further comprising a heater disposed on the substrate and configured to heat the metal structure so as to melt the metal structure.

10. The protective device according to claim 9, wherein the substrate has a first surface and a second surface opposite to the first surface, the electrode layer comprises a first electrode layer disposed on the first surface, the first electrode layer comprises a first side electrode, a second side electrode and a middle electrode disposed between the first side electrode and the second side electrode, and the heater is electrically connected to the middle electrode.

11. The protective device according to claim 1 further comprising at least one hole disposed in a portion of the substrate and the hole is corresponded to the gap of the electrode layer.

12. The protective device according to claim 1, wherein the arc extinguishing structure is disposed on an inner surface of the outer cover facing to the gap.

13. The protective device according to claim 12, wherein material of the arc extinguishing structure comprises pressure sensitive adhesive or polysiloxanes.

14. The protective device according to claim 13, wherein the pressure sensitive adhesive comprises silicone pressure sensitive adhesive.

15. A protective module, comprising:

a circuit board;

an overcurrent and overvoltage protective device disposed on the circuit board, the overcurrent and overvoltage protective device comprising:

a substrate disposed on the circuit board;

an electrode layer disposed on the substrate, the electrode layer comprising at least one gap;

a metal structure disposed on the electrode layer and located above the gap;

an outer cover disposed on the substrate and covering the metal structure and a portion of the electrode layer; and an arc extinguishing structure disposed between the outer cover and the substrate; and a protective film covering the overcurrent and overvoltage protective device and a portion of the circuit board.

16. The protective module according to claim 15, wherein the overcurrent and overvoltage protective device further comprises an arc extinguishing structure disposed in the gap and located between the metal structure and the substrate.

17. The protective module according to claim 16, material of the arc extinguishing structure comprises polysiloxanes.

18. The protective module according to claim 16, wherein the arc extinguishing structure comprises a plurality of inorganic particles and a flux.

19. The protective module according to claim 15, wherein the overcurrent and overvoltage protective device further comprises at least one hole disposed in a portion of the substrate, and the hole is corresponded to the gap of the electrode layer.

20. The protective module according to claim 15, wherein the overcurrent and overvoltage protective device further comprises an arc extinguishing structure disposed on an inner surface of the outer cover facing to the gap, and material of the arc extinguishing structure comprises pressure sensitive adhesive or polysiloxanes.

21. The protective module according to claim 20, wherein the pressure sensitive adhesive comprises silicone pressure sensitive adhesive.

22. The protective module according to claim 15 further comprising a heater disposed on the substrate and configured to heat the metal structure so as to melt the metal structure.

* * * * *